United States Patent [19]

Hirota et al.

[11] Patent Number: 5,235,428
[45] Date of Patent: Aug. 10, 1993

[54] AUTO-FOCUS SYSTEM FOR VIDEO CAMERA

[75] Inventors: Katsuaki Hirota, Kanagawa; Akihiro Kikuchi, Chiba; Toshiharu Kondo, Kanagawa; Takashi Kohashi; Fumiaki Kato, both of Chiba, all of Japan

[73] Assignee: Sony Corporation, Tokyo, Japan

[21] Appl. No.: 985,450

[22] Filed: Dec. 3, 1992

Related U.S. Application Data

[63] Continuation of Ser. No. 695,711, Feb. 15, 1991, abandoned.

[30] Foreign Application Priority Data

Feb. 21, 1990 [JP] Japan .................. 2-040814
Feb. 21, 1990 [JP] Japan .................. 2-040815

[51] Int. Cl.$^5$ ................ H04N 5/232; H04N 5/225
[52] U.S. Cl. ................... 358/227; 358/225
[58] Field of Search ........... 358/227, 225, 209; 354/400, 402

[56] References Cited

U.S. PATENT DOCUMENTS

| | | | |
|---|---|---|---|
| 4,853,788 | 8/1989 | Murashima et al. | 358/225 |
| 4,872,058 | 10/1989 | Baba et al. | 358/227 |
| 4,899,194 | 2/1990 | Hori | 358/227 |
| 4,903,135 | 2/1990 | Ohtake et al. | 358/225 |
| 4,967,279 | 10/1990 | Murashima | 354/400 |
| 4,980,773 | 12/1990 | Suda et al. | 358/227 |
| 4,998,162 | 3/1991 | Kondo et al. | 358/227 |
| 5,003,339 | 3/1991 | Kikuchi et al. | 358/227 |

FOREIGN PATENT DOCUMENTS

| | | |
|---|---|---|
| 74132/87 | 6/1987 | Australia . |
| 34619/89 | 11/1989 | Australia . |
| 0197598 | 10/1986 | European Pat. Off. . |
| 0331502 | 9/1989 | European Pat. Off. . |
| 60-212071 | 10/1985 | Japan .................. 358/227 |
| 61-013776 | 1/1986 | Japan . |
| 62-107577 | 5/1987 | Japan . |
| 3-010578 | 1/1991 | Japan . |
| 430519 | 12/1972 | U.S.S.R. .................. 358/227 |

OTHER PUBLICATIONS

Patent Abstracts of Japan vol. 10, No. 50 (E-384) (2107) Feb. 27, 1986 & JP-A-60 204 181 (Ricoh K.K.) Oct. 15, 1985.
Patent Abstracts of Japan, vol. 12, No. 150 (E-606) (2997) May 10, 1988 & JP-A-62 264 774 (Matsushita Electric Industrial Co., Ltd.) Nov. 17, 1987.
Patent Abstracts of Japan vol. 11, No. 145 (E-505) (2592) May 12, 1987 & JP-A-61 281 774 (Sanyo Electric Co., Ltd.) Dec. 12, 1986.
Patent Abstracts of Japan, vol. 11, No. 249 (E-532) (2696) Aug. 13, 1987 & JP-A-62 060 369 (Sankyo Seiki Mfg. Co. Ltd.) Mar. 1987.

*Primary Examiner*—Michael T. Razavi
*Assistant Examiner*—Wendy R. Greening
*Attorney, Agent, or Firm*—William S. Frommer; Alvin Sinderbrand

[57] ABSTRACT

A focus detection signal is generated from the video signal produced by a video camera by deriving higher frequency components of that video signal, detecting when those higher frequency components exceed a minimum threshold level, sensing when the video signal exceeds a maximum threshold, and integrating those higher frequency components which exceed the minimum threshold, except during an interval when the video signal exceeds the maximum threshold, thereby producing the focus detection signal.

33 Claims, 9 Drawing Sheets

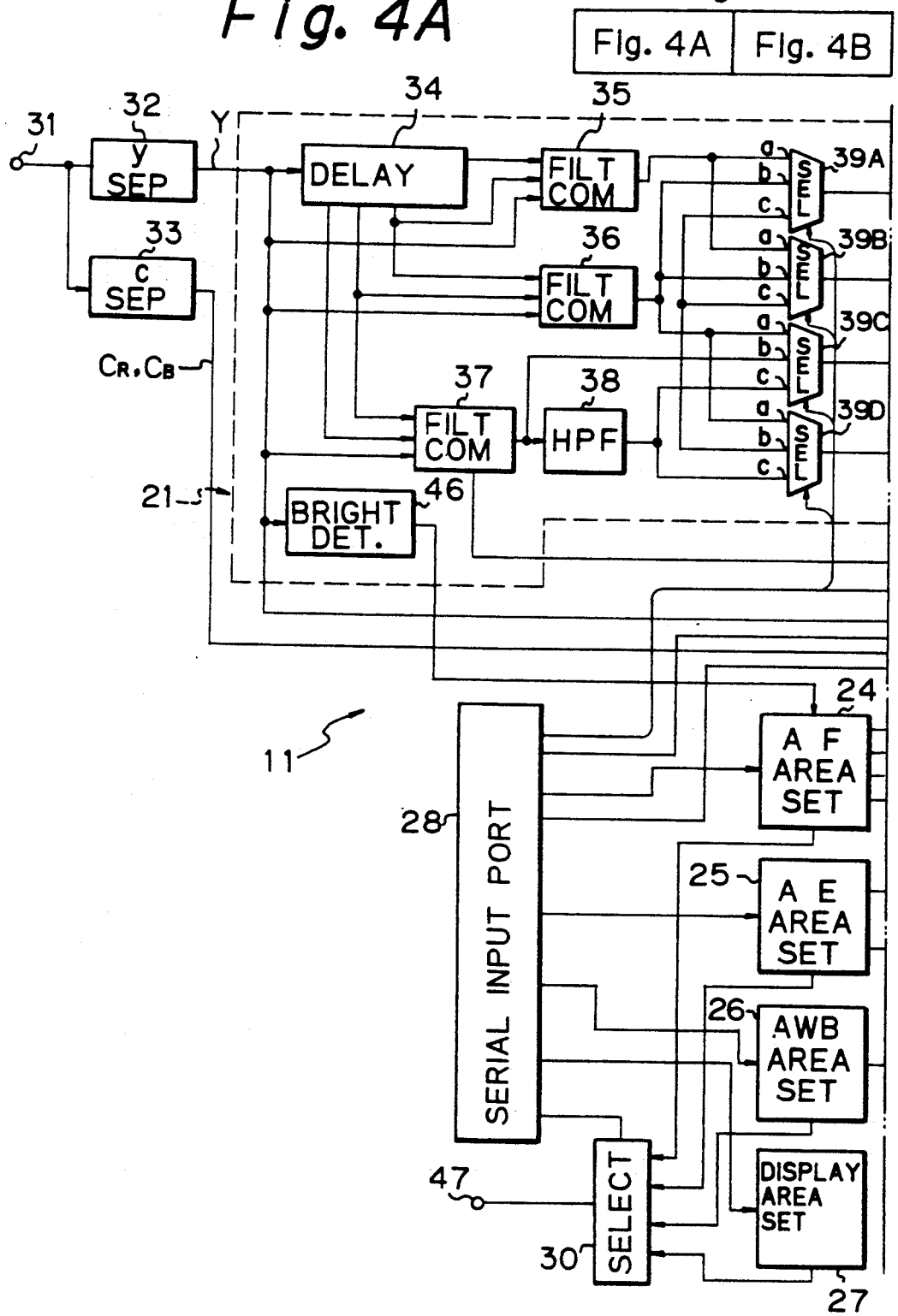

Fig. 5A PRIOR ART
| --- | Cy+ G | Ye+M | Gy+G | Ye+ M | --- |
Fig. 5B PRIOR ART
| --- | Cy+ M | Ye+ G | Cy+ M | Ye+ G | --- |
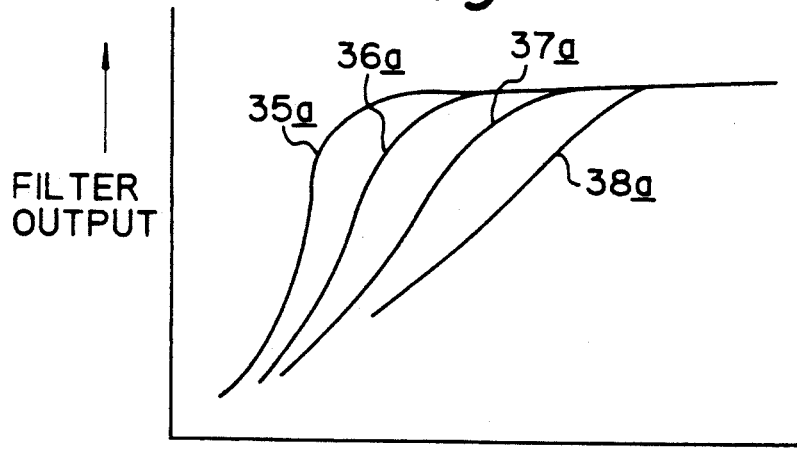
Fig. 6
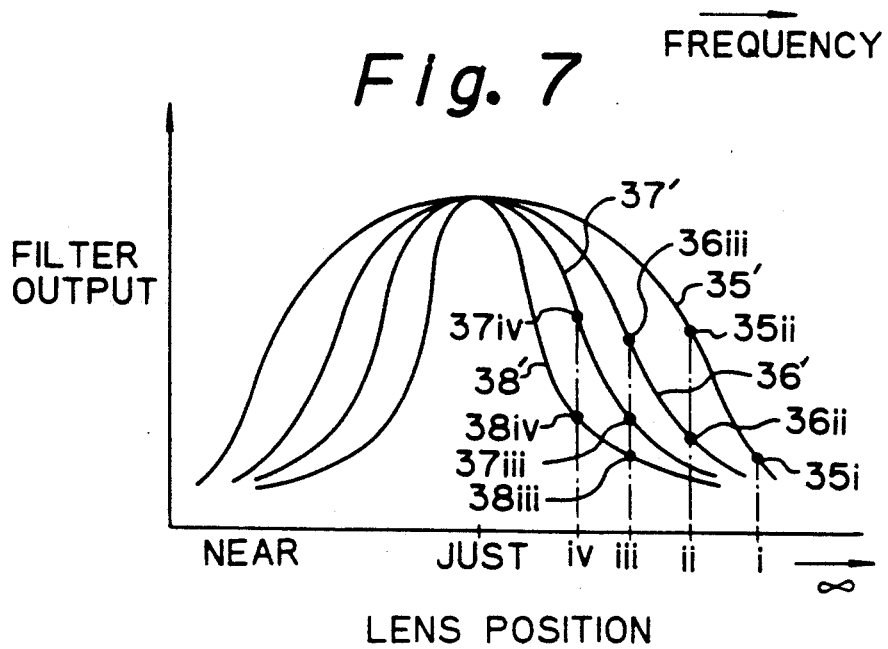
Fig. 7

AUTO-FOCUS SYSTEM FOR VIDEO CAMERA

This application is a continuation of application Ser. No. 07/695,711, filed Feb. 15, 1991.

RELATED APPLICATIONS

Reference is made to U.S. applications Ser. No. 07/653,364, filed Feb. 11, 1991, now U.S. Pat. No. 5,093,716 and Ser. No. 07/654,198, filed Feb. 12, 1991 for disclosure of subject matter related to the present invention.

BACKGROUND OF THE INVENTION

1. Field of the Invention

This invention relates to auto-focus control for use in a video camera and, more particularly, to improvements in producing an auto-focus control signal even if the scene being imaged by the camera is of relatively low contrast or contains areas of high brightness, either of which could impart errors in a focus detection signal.

2. Discussion of the Prior Art

One example of an auto-focus control arrangement is described in copending application Ser. No. 393,804, filed Aug. 15, 1989, now U.S. Pat. No. 4,998,162 and assigned to the assignee of the present invention. In that arrangement, when a camera is focused properly on an object, that is, when the adjustable lens elements included therein are at the "just-focused" position, the image of the object which is focused is provided with sharp boundaries between areas or relative to, for example, the background which is not focused. The video signal derived from this image includes sudden transitions at these sharp boundaries, resulting in high frequency components. Thus, the level of these high frequency components is indicative of the focus condition of the lens. That is, the high frequency components are at a maximum amplitude when the lens is at its just-focused position; whereas the amplitude of the high frequency components is reduced when the lens is at other positions.

As disclosed in the aforementioned application, the higher frequency components (e. g. above 1 MHz and, preferably, above 500 KHz) included in the video signal are integrated; and the value of the integrated signal is used as an indication of the focus condition of the lens. Since the amplitude of the higher frequency components may vary over a scan line and throughout a video field, it is preferred to integrate the higher frequency components to minimize rapid variations in the focus condition. Since a focus condition indication is used to drive a lens adjustment motor, the slowly varying signal produced by integration avoids sudden and constant changes in the motor drive signal.

While the aforementioned auto-focus technique operates generally satisfactorily, errors may be introduced into the focus control signal when the camera images a scene having relatively low contrast, such as a scene that appears as a relatively simple pattern. The video signal produced in response to such an imaged scene has higher frequency components of a relatively low amplitude. However, noise signals that may be passed by the filtering circuitry may be of a sufficiently high amplitude as to be construed erroneously as the higher frequency video signals. Consequently, the noise signals are integrated and used as an indication of the lens focus condition.

Another drawback associated with the aforementioned auto-focus arrangement is present when the scene being imaged contains a portion with a very high brightness level. This may occur if the imaged scene contains an object of high reflectivity, such as a mirror, a polished white subject, or the like, a light source, such as a fluorescent lamp, a flame, a strobe light, the sun, etc. The high brightness portion of the imaged scene produces a video signal whose higher frequency components may be of an excessively high amplitude. Hence, when the higher frequency components are integrated by the focus detection arrangement, the excessive amplitudes caused by the high brightness portion of the imaged scene may produce false indications of the lens focus condition. Additionally, to accommodate these very high amplitudes requires a very wide dynamic range which, in turn, is relatively expensive to implement.

OBJECTS AND SUMMARY OF THE INVENTION

Therefore, it is an object of the present invention to provide a method and apparatus for automatically focusing the lens of a video camera which overcomes the aforenoted drawbacks and disadvantages.

Another object of this invention is provide an auto-focus technique which focuses a lens to its just-focused condition accurately and quickly even when the lens images a scene with relatively low contrast.

A further object of this invention is to provide an auto-focus technique of the aforementioned type which provides good noise rejection to prevent auto-focus errors when a low contrast scene is imaged.

An additional object of this invention is to provide an auto-focus technique of the aforementioned type which is not deleteriously influenced by noise signals which may be produced when a low contrast scene is imaged.

Another object of this invention is to provide an auto-focus technique which is not deleteriously influenced by high brightness portions in the scene being imaged.

A still further object of this invention is to provide an auto-focus technique of the aforementioned type which does not erroneously respond to high amplitude components caused by very bright areas in a scene being imaged.

Various other objects, advantages and features of the present invention will become readily apparent from the ensuing detailed description, and the novel features will be particularly pointed out in the appended claims.

In accordance with this invention, a focus detection signal is generated from the video signal produced by a video camera by deriving higher frequency components of the video signal, detecting when the level of the higher frequency components exceeds a minimum threshold to produce a detected signal, sensing when the video signal exceeds a maximum threshold, and integrating the detected higher frequency components which exceed the minimum threshold, except during an interval when the video signal exceeds the maximum threshold, to produce the focus detection signal.

In the preferred embodiment, the video signal comprises a luminance signal, preferably a digital luminance signal. Higher frequency components are derived from the luminance signal by digitally filtering intermediate and higher frequencies therein, and it is preferable to use digital techniques for providing those intermediate and higher frequencies.

As an aspect of this invention, the minimum threshold is established at a level greater than an expected noise signal level when the video camera images a scene with relatively little contrast changes therein.

Preferably, the higher frequency components which exceed the minimum threshold are supplied to an integrator by a gate arrangement which is enabled during periods that define an auto-focus area in the scene being imaged by the camera. Advantageously, peak levels of the higher frequency components which exceed the minimum threshold are integrated.

As another aspect of this invention, the gate arrangement is disabled during the interval that the video signal exceeds the aforementioned maximum threshold.

BRIEF DESCRIPTION OF THE DRAWINGS

The following detailed description, given by way of example, will best be understood in conjunction with the accompanying drawings in which:

FIGS. 4A-4B are a block diagram of the optical detector shown in FIG. 1, which incorporates the present invention;

FIGS. 5A and 5B are useful in understanding how the optical detector shown in FIG. 4 separates luminance and chrominance components from the video signal produced by the checkerboard pattern shown in FIG. 3;

FIG. 6 is a graphical representation of the frequency characteristics of the digital high pass filters used in the optical detector of FIG. 4;

FIG. 7 is a graphical representation of the spectral characteristics of the digital filter circuits as a function of the focus condition of the lens included in the video camera of FIG. 1;

DETAILED DESCRIPTION OF PREFERRED EMBODIMENTS

Figure 1:
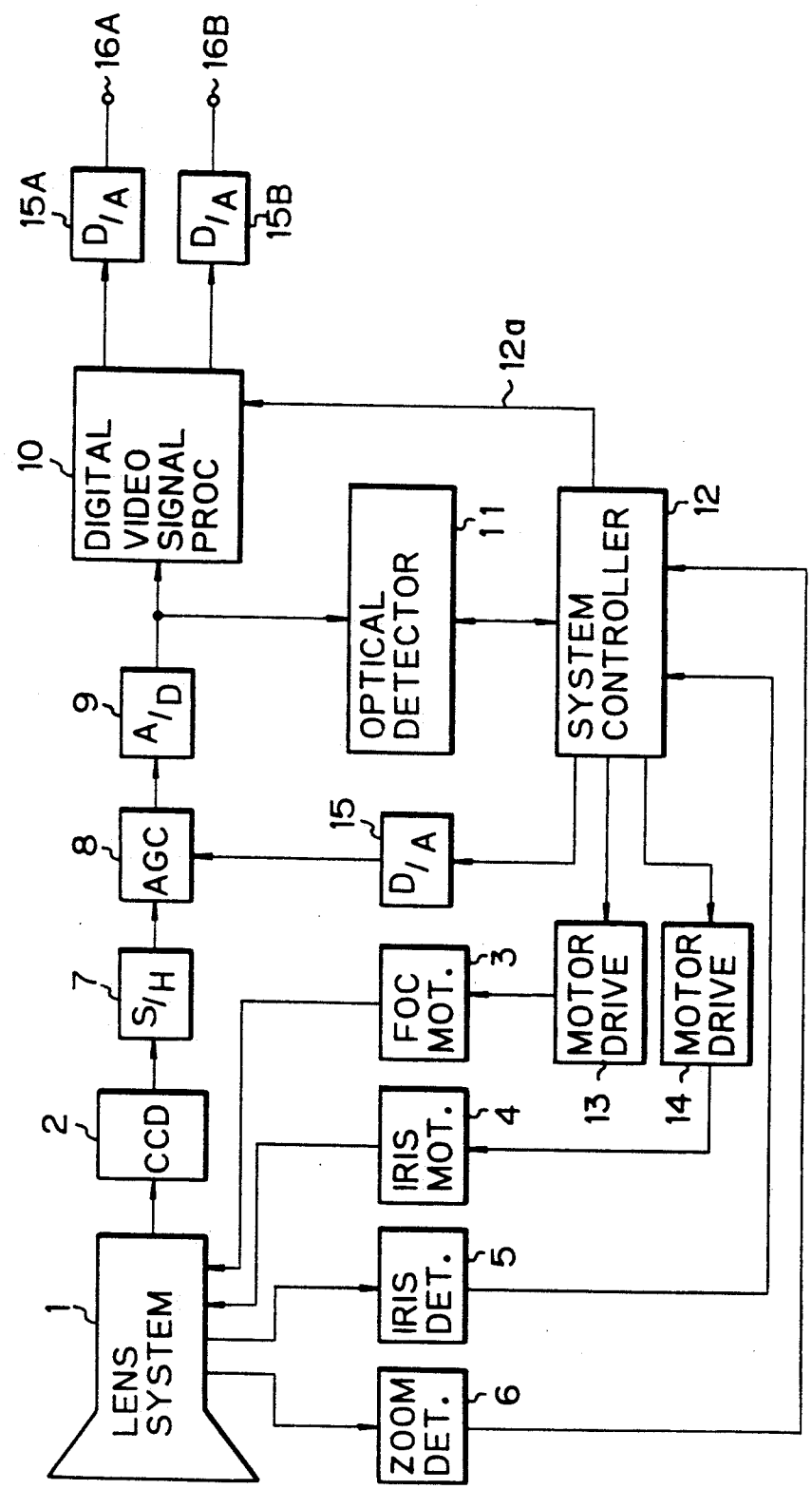
FIG. 1 is a block diagram of a video camera in which the present invention finds ready application.
Figure 2:
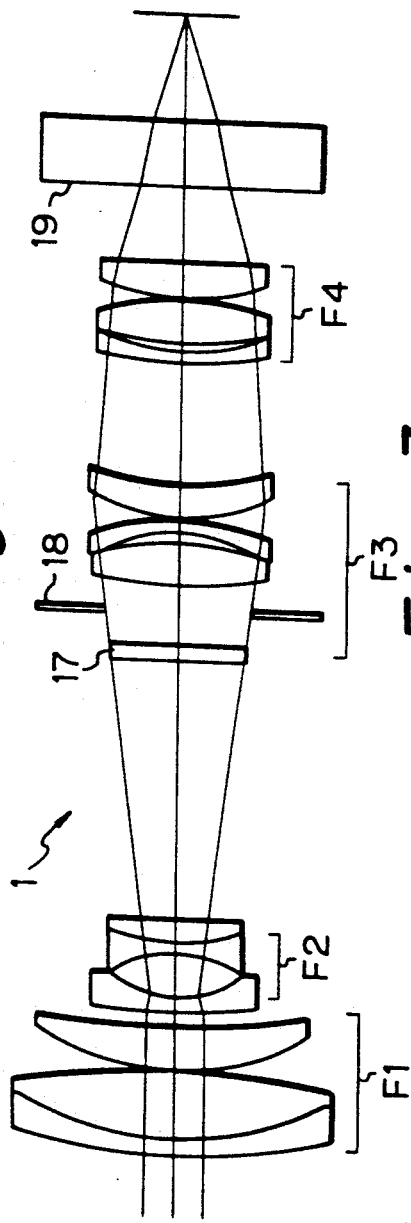
FIG. 2 is a schematic representation of the lens system which is controlled by the present invention.

Turning now to the drawings, reference is made to FIG. 1 which is a block diagram representing a video camera with which the present invention may be used. The video camera represented in FIG. 1 may be similar to that described in aforementioned application Ser. No. 393,804. The video camera includes a lens system 1, an imaging device 2, a digitizing circuit comprised of sample-and-hold circuit 7, AGC circuit 8 and analog-to-digital (A/D) converter 9, a digital video processor 10, a digital-to-analog (D/A) converter 15, an optical detector 11, a system controller 12 and a focus and exposure drive arrangement. Lens system 1 preferably includes zoom lens elements and an adjustable lens group for focusing the lens system between near and far (infinity) focus conditions. As referred to herein, the expression "just-focused" means that the lens system is properly focused on an object being imaged. Lens system 1 is illustrated in FIG. 2 as being comprised of lens groups F1, F2, F3 and F4, wherein lens group F2 comprises a zoom lens arrangement and lens group F4 comprises a focus lens system. A PN filter 17 is disposed between lens groups F2 and F3; and an adjustable aperture 18, such as an adjustable iris, is illustrated adjacent the PN filter. An infrared inhibitor 19 serves to remove infrared radiation from the optical image which is focused onto the imaging device.

Lens group F4 is driven by a focus motor 3 (FIG. 1). Iris 18 is driven by an iris motor 4 to increase or decrease the aperture and, thus, the exposure of lens system 1. The focus and iris motors are controlled by system controller 12 by way of driver circuits 13 and 14, respectively. The system controller receives signals from an iris position detector 5 and from a zoom position detector 6 to control iris 18 and also to control the zoom lens group F2, respectively. The manner in which the system controller operates to adjust the iris and the zoom lens group forms no part of the present invention per se and is not further described.

Figure 3:
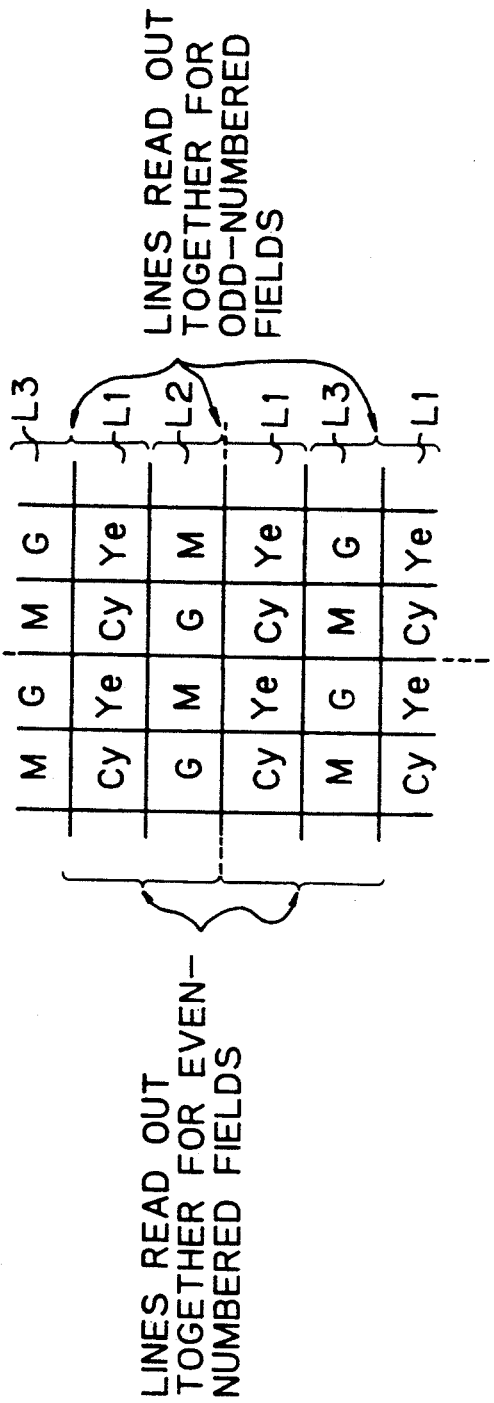
FIG. 3 is a schematic representation of a complementary-colored checkerboard pattern that may be used with the image pickup device of the video camera shown in FIG. 1.

Lens system 1 serves to project an optical image of a scene onto imaging device 2. Preferably, the imaging device is comprised of a CCD array of the type shown in FIG. 3 and is adapted to generate a video signal as the individual elements which comprise the CCD array are scanned. As shown in FIG. 3, the CCD array is comprised of rows and columns of pixel elements arranged in a complementary-colored checkerboard pattern. This pattern is comprised of successive rows or lines L1, L2, L1, L3, L1, L2, etc., wherein each line L1 is formed of alternating cyan and yellow pixel elements Cy, Ye, Cy, Ye, etc., each line L2 is comprised of alternating green and magenta pixel elements G, M, G, M, etc. and each line L3 is comprised of alternating magenta and green elements M, G, M, G, etc. In one embodiment, each row of CCD image pickup device 2 is comprised of 510 pixel elements; and in another embodiment, each row is comprised of 760 pixel elements. The pixel elements in a row are scanned successively on a row-by-row basis. For the embodiment wherein a line is comprised of 510 pixel elements, the pixel elements are scanned at a scanning clock frequency $(8/3)f_{sc}=9.55$ MHz. In the alternative embodiment wherein each line is comprised of 760 pixel elements, the successive pixel elements are scanned at the scanning clock frequency $4f_{sc}=14.32$ MHz.

Returning to FIG. 1, each scanned pixel element produces a pixel signal level of a magnitude determined by the brightness of a respective portion in the image projected thereon. Successive pixel levels are sampled by sample-and-hold circuit 7; and each sample is converted to digital form by A/D converter 9. As shown, each analog pixel level produced by sample-and-hold circuit 7 is coupled to the A/D converter by way of automatic gain control (AGC) circuit 8. The AGC circuit preferably is an analog circuit supplied with a gain setting voltage from system controller 12. The system controller includes a microprocessor and produces a digital gain controlling signal which is converted to analog form by D/A converter 15.

As will be discussed below in conjunction with FIGS. 5A and 5B, the complementary colored checkerboard pattern comprising CCD pickup device 2 is scanned such that each scan output is comprised of two vertically adjacent pixel elements. That is, two adjacent rows are scanned simultaneously. For example, a pixel element in row L1 and a vertically aligned pixel element in row L2 are scanned, followed by the next pixel element in row L1 and a vertically adjacent pixel element in row L2. Similarly, when rows L1 and L3 are scanned together, one pixel element in row L1 is scanned concurrently with a vertically aligned pixel element in row L3. These vertically adjacent pixels are summed and sampled by the sample-and-hold circuit.

A/D converter 9 preferably produces a 10-bit digital signal representing each sample produced by the sample-and-hold circuit. The digitized samples are coupled from A/D converter 9 to digital video processor 10 and also to optical detector 11. The optical detector includes an auto-focus (AF) detection circuit, an auto-exposure (AE) detection circuit and an auto-white balance (AWB) detection circuit, described in greater detail in conjunction with FIG. 4. The AF, AE and AWB detection circuits produce auto-focus, auto-exposure and auto-white balance detection signals, respectively. These signals are supplied from optical detector 11 to system controller 12 whereat they are used to control lens driver 13 to drive focus motor 3 so as to adjust the focus condition of lens system 1, to control iris driver 14 to drive iris motor 4 and thereby vary the exposure aperture so as to control the exposure condition of the video camera and to control digital video processor 10 in accordance with the detected white balance of the image picked up by the video camera. System controller 12 also produces the gain setting signal for AGC circuit 8 in response to the detected exposure level sensed by optical detector 11.

Optical detector 11 and system controller 12 are interconnected by way of a serial interface, whereby the AF detection signal, AE detection signal and AWB detection signal produced by optical detector 11 are supplied as AF, AE and AWB control signals by way of a serial output port from the optical detector to the system controller; and whereby control signals produced by system controller 12 are applied to the optical detector by way of a serial input port. It is appreciated that a serial interface reduces the complexity, bulk and weight of the interconnections between the optical detector and the system controller. Preferably, the signals communicated between the optical detector and the system controller exhibit a periodicity corresponding to the vertical period intervals of the video signal.

Digital video processor 10 produces luminance and chrominance signals corresponding to the digitized samples supplied thereto by A/D converter 9. The manner in which the digital video processor operates forms no part of the present invention per se and, therefore, is not further described herein. Suffice it to say that the digitized luminance and chrominance signals produced by the digital video processor are converted to analog form by D/A converters 15a and 15b, respectively. As a result, analog luminance and chrominance signals are supplied to output terminals 16a and 16b, respectively, from which they may be recorded, displayed or processed further.

Figure 4B:
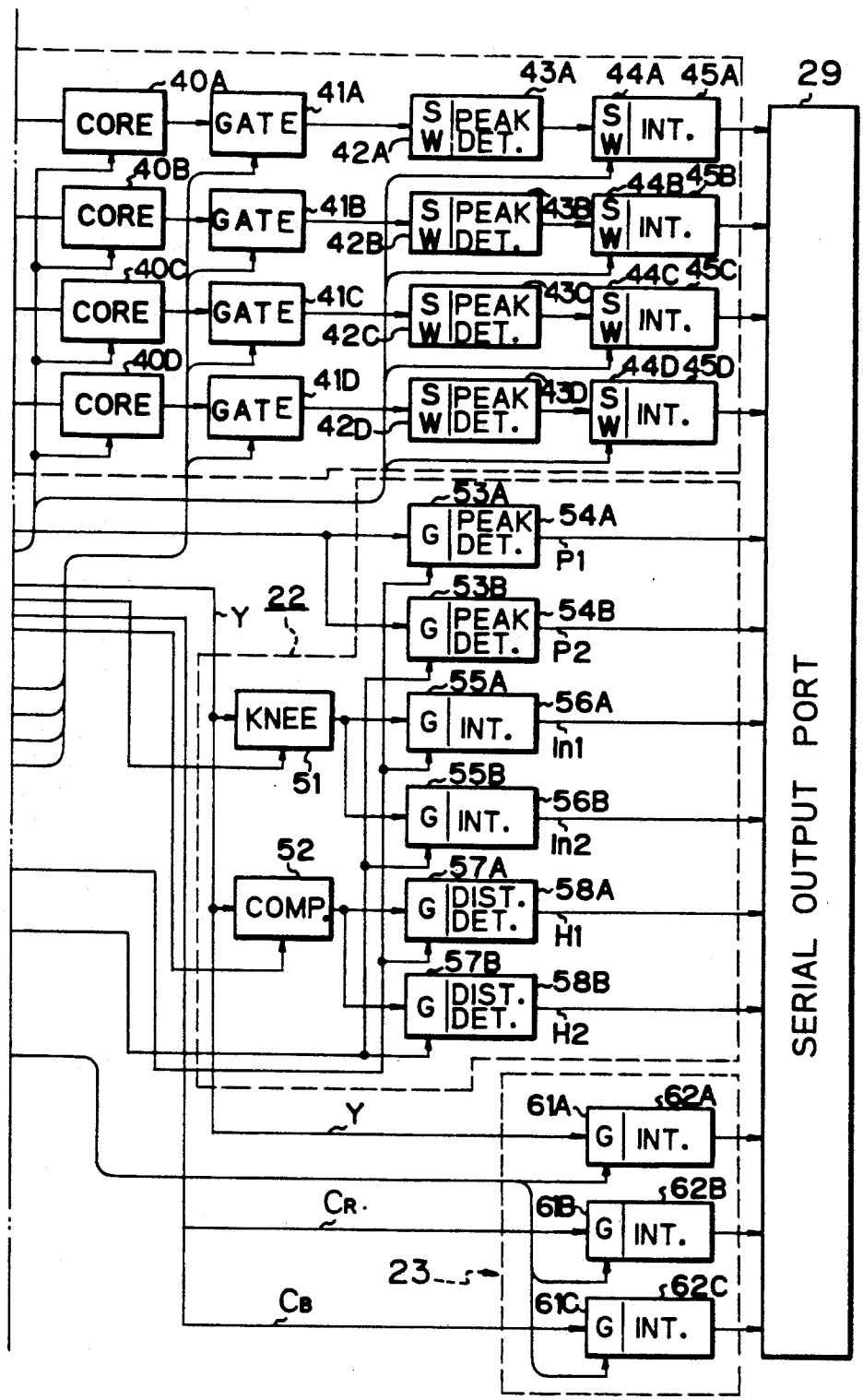

Referring now to FIG. 4, there is illustrated a more detailed block diagram of optical detector 11. The optical detector is comprised of an auto-focus detector 21, an auto-exposure detector 22 and an auto-white balance detector 23, as depicted in FIG. 4 by broken lines. Each of these detectors now is described in greater detail.

Auto-focus Detector 21

One embodiment of digital circuits which may be used to implement the auto-focus detector is illustrated in FIG. 4. Alternatively, the auto-focus detector may be implemented by suitable programming of a microprocessor, as will become apparent from the following description.

In the embodiment wherein the auto-focus detector is implemented by digital circuits, the detector is comprised of digital filters adapted to filter intermediate and higher frequency components from a video signal, selector circuits 39 adapted to select different filtering characteristics from the digital filters as lens group F4 is adjusted to its just-focused position, coring circuits 40 adapted to reject noise signals from the filtered intermediate and higher frequency components, gate circuits 41 adapted to limit the filtered higher frequency components to discrete auto-focus areas of the imaged picture, peak detectors 43 adapted to detect the peaks of the intermediate and higher frequency components derived by the digital filters, and integrators 45 adapted to integrate the detected peaks. An input terminal 31 is adapted to receive a digitized composite video signal, as may be produced by A/D converter 9 of FIG. 1. A luminance separator 32 and a chrominance separator 33 are coupled to input terminal 31 to separate a luminance component Y and chrominance component $C_R$ and $C_B$ from the composite video signal. In the preferred embodiment, an auto-focus signal which represents the focus condition of lens system 1 is derived from the separated luminance component Y.

The auto-focus signal is produced from the luminance component in a discrete area of the video picture being imaged. This discrete area is established by an auto-focus area setting circuit 24 which establishes the focus detection area in which intermediate and higher frequency components of the luminance signal are examined. The focus detection area is established by system controller 12 which supplies a suitable control signal to auto-focus area setting circuit 24 by way of a serial input port 28. For example, since the complementary colored checkerboard array of pixel elements shown in FIG. 3 is scanned pixel by pixel and line by line, the auto-focus area setting circuit determines when particular pixels included in the focus setting area are scanned. When those pixels are scanned, as may be suitably established by timing control included in system controller 12, an auto-focus area enabling signal is produced. This enabling signal is used as a gating signal, as will be described.

Figure 11A:
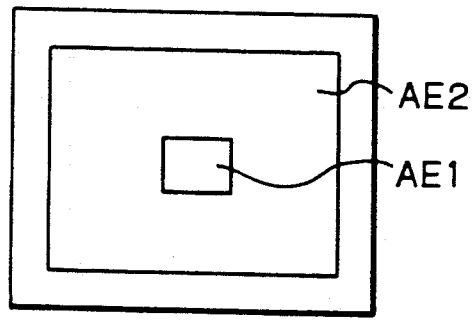
FIGS. 11A and 11B represent predetermined exposure areas of the picture derived from the video camera of FIG. 1.
Figure 11B:
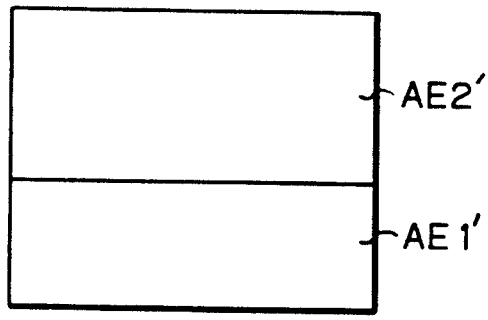

Preferably, system controller 12 controls auto-focus area setting circuit 24 to establish two or more focus detection areas. In the preferred embodiment herein, one focus detection area is a relatively small discrete area included within a larger discrete area. For example, FIG. 11A illustrates a preferred embodiment of smaller focus detection area AE1 encluded within larger focus detection area AE2. Alternatively, the two discrete focus detection areas may be as illustrated in FIG. 11B wherein the two areas AE'1 and AE'2 extend laterally across the image and are of substantially equal dimensions, with one area being disposed vertically above the other. It will be appreciated that other focus detection areas may be used and three, four or more focus detection areas may be provided, if desired.

Auto-focus area setting circuit 24 includes an output coupled to a selector 30 to which outputs from auto-exposure area setting circuit 25, automatic white balance area setting circuit 26 and a display area setting circuit 27 also are supplied. The selector is controlled by system controller 12 to couple one of the outputs supplied thereto to an output terminal 47. As a result of the selected area setting output signal, a camera viewfinder (not shown) displays a corresponding area outline. The user of the camera thus may observe the focus detection area which is used by the auto-focus detector to produce the focus detection signal. Similarly, the exposure detection area produced by circuit 25, the white balance detection area produced by circuit 26 or the display area produced by circuit 27 may be observed. The video camera may be provided with suitable manual controls (not shown) to select a desired one of these areas for display.

Before describing the auto-focus detector in greater detail, a brief explanation as to how the luminance and chrominance components are separated from the digitized pixels produced by scanning the checkerboard pattern shown in FIG. 3 is provided. The digitized pixels are supplied to an input terminal 31 (FIG. 4) from which they are coupled to luminance separator 32 and to chrominance separator 33. As mentioned previously, the checkerboard pattern is scanned such that successive vertical pairs of pixel elements are scanned. This successive scanning of pixel pairs produces the signal shown in FIG. 5A when rows L1 and L2 are scanned, and produces the signal shown in FIG. 5B when rows L1 and L3 are scanned. As shown in FIG. 5A, when pixel element Cy in row L1 is scanned concurrently with pixel element G in row L2, the resultant digitized pixel corresponds to a sum signal (Cy+G). When the next adjacent pixel element Ye of row L1 is scanned concurrently with the next adjacent pixel element M of row L2, the sum signal (Ye+M) is produced. FIG. 5A represents the summed pixels which are produced as successive pixel pairs in rows L1 and L2 are scanned.

Similarly, when rows L1 and L3 are scanned concurrently, the scanning of pixel element Cy in row L1 with pixel element M in row L3 results in the sum signal (Cy+M). Likewise, when pixel element Ye in row L1 is scanned concurrently with pixel element G in row L3, the sum signal (Ye+G) is produced. FIG. 5B represents the successive summed signals produced as respective pixel pairs in rows L1 and L3 are scanned in succession.

Chrominance separator 33 operates to subtract successive summed signals produced by the row-by-row scanning of the checkerboard array shown in FIG. 3. In particular, when the summed signal shown in FIG. 5A is produced, the digital sample (Cy+G) is subtracted from the digital sample (Ye+M). Now, since a yellow signal is formed by adding red and green signals (Ye=R+G), a magenta signal is formed by adding red and blue signals (M=R+B) and a cyan signal is produced by adding blue and green signals (Cy =B+G), the subtracting operation carried out by chrominance separator 33 when the summed signals of FIG. 5A are produced may be expressed as follows:

$$(Ye + M) - (Cy + G) = [(R + G) + (R + B)] - [(B + G) + G]$$
$$= 2R - G$$
$$= C_R$$

Similarly, the subtracting operation carried out by chrominance separator 33 when the summed signals represented by FIG. 5B are produced may be expressed as follows:

$$(Ye + G) - (Cy + M) = [(R + G) + G] - [(B + G) + (R + B)]$$
$$= 2B - G$$
$$= C_B$$

Thus, chrominance separator 33 separates the chrominance components $C_R$ and $C_B$ from the digitized video signal supplied to input terminal 31 from A/D converter 9.

Luminance separator 32 operates by summing two successive digitized samples produced by the A/D converter. For example, when the samples shown in FIG. 5A are produced, the luminance separator operates to sum these samples as follows:

$$(Ye + M) - (Cy + G) = [(R + G) + (R + B)] - [(B + G) + G]$$
$$= 3G + 2R + 2B$$
$$= Y$$

Likewise, the luminance separator operates to sum every two samples of the signal represented by FIG. 5B, as follows:

$$(Ye + G) - (Cy + M) = [(R + G) + G] + [(B + G) + (R + B)]$$
$$= 3G + 2R + 2B$$
$$= Y$$

In addition to separating the luminance and chrominance components as discussed above, separator circuits 32 and 33 convert the sampling frequency at which the digitized luminance and chrominance components are produced. For example, if the checkerboard pattern of FIG. 3 is comprised of 510 pixel elements in a row, the sampling frequency is converted from $(8/3)f_{sc}$ to a re-clocked rate of $2f_{sc}$. Alternatively, if the checkerboard pattern is comprised of 760 pixel elements in a row, the sampling frequency is converted from $4f_{sc}$ to $2f_{sc}$. The separated, digitized luminance signal is supplied from luminance separator 32 to auto-focus detector 21 and also to auto-exposure detector 22 and to auto-white balance detector 23. The separated chrominance components produced by chrominance separator 33 are supplied to automatic white balance detector 23.

Returning now to the auto-focus detector of FIG. 4, the digitized luminance signal Y is supplied to digital filters which serve to separate intermediate and higher frequency components from the luminance signal. As mentioned above, when lens group F4 is disposed at its just-focused position, sharp transitions are provided in the luminance signal, resulting in intermediate and higher frequency components (for example, frequencies which exceed 1 MHz and, preferably, those which exceed 500 KHz) that exhibit relatively high amplitudes. The focus condition of the lens thus may be determined by detecting the amplitude of these intermediate and higher frequency components. For simplification, the expression "higher frequency components" is used hereafter to refer to both intermediate and higher frequencies.

The digital filters are comprised of a delay circuit 34 adapted to receive the digitized luminance signal Y, filter processors or computers 35, 36 and 37 and a high pass filter circuit 38. Delay circuit 34 may be a conventional digital delay line, such as may be formed by cascaded CCD's. Each filter processor is coupled to respective outputs, or taps, of delay circuit 34, and each filter processor is comprised of a summation circuit supplied with individually weighted outputs that are tapped from the delay circuit. It will be appreciated that filter processors 35, 36 and 37 are conventional. By establishing different weighting coefficients coupled to different delay line taps, each filter processor exhibits different filtering characteristics. Examples of the individual filtering characteristics of filter processors 35, 36 and 37 are graphically illustrated as the examples 35a, 36a and 37a, respectively, shown in FIG. 6. FIG. 6 also graphically represents an example 38a of the filtering characteristic of high pass filter 38. It is seen that the cut-off frequencies of filters 35, 36, 37 and 38 increase, as shown in FIG. 6.

As mentioned previously, the amplitude, or level, of the higher frequency components included in luminance signal Y is at a maximum when lens group F4 is at its just-focused position, and this amplitude, or level, decreases as the lens moves from that position to increase its unfocused condition. Accordingly, a relationship may be established between the position of lens group F4 and the filtered signals produced by filter processors 35, 36 and 37 and by high pass filter 38. This relationship is graphically illustrated in FIG. 7; and it is seen that the spectral characteristics 35', 36', 37' and 38' of filter processors 35, 36 and 37 and high pass filter 38 tend to become "sharper", or more narrowly defined, from filter processor 35 to high pass filter 38. These different filter characteristics are used by auto-focus detector 21 to produce a focus detection signal which may be used to drive lens group F4 accurately and quickly to its just-focused position.

Selectors 39 are comprised of a plurality of selector circuits of which four are illustrated in the preferred embodiment. Selector circuits 39A, 39B, 39C and 39D may be comprised of suitable digital switches controlled by a selection signal produced by system controller 12 and supplied to the selector circuits by serial input port 28. In the illustrated example, each selector circuit includes three inputs, any one of which may be selected to be connected to the output thereof. Inputs a, b and c of selector circuits 39A and 39B are coupled to the outputs of filter processors 35, 36 and 37, respectively. Inputs a, b and c of selector circuits 39C and 39D are coupled to the outputs of filter processors 36 and 37 and also to the output of high pass filter 38, respectively. Thus, depending upon the operation of a selector circuit, a particular filter characteristic may be selected to pass the higher frequency components of the digitized luminance signal Y.

Coring circuits 40 are comprised of individual coring circuits 40A, 40B, 40C and 40D coupled to selector circuits 39A, 39B, 39C and 39D, respectively. In the preferred embodiment, each coring circuit is comprised of a threshold detector adapted to detect when the amplitude, or level, of the higher frequency component supplied thereto from a selector circuit exceeds a minimum threshold level. That minimum threshold level is determined by a suitable control signal supplied to the coring circuits by system controller 12 via serial input port 28. In the preferred embodiment, this minimum threshold level is approximately equal to the expected noise signal level included in luminance signal Y when the video camera images a scene with relatively little contrast changes therein.

Figure 8A:
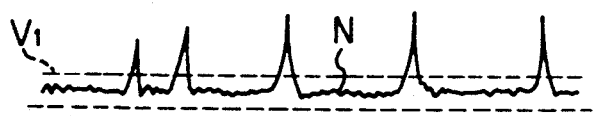
FIGS. 8A and 8B are waveform diagrams which are useful in understanding one aspect of the present invention.
Figure 8B:

An appreciation of the function of coring circuits 40A-40D will best be appreciated by referring to the waveform diagrams of FIGS. 8A and 8B. When the video camera images a scene having relatively low contrast, such as a scene that appears as a relatively simple pattern, the noise signal N which passes through the digital filters may be erroneously detected as a higher frequency component of the luminance signal. As a result, such false detection of the noise signal N may produce a focus detection signal which will be used by system controller 12 to perform an erroneous focus operation. However, by detecting only those signal levels which exceed a threshold above the expected noise signal level N, such as those signal levels which exceed threshold $V_1$ shown in FIG. 8A, such erroneous detection of the noise signal level is substantially avoided. Coring circuits 40A-40D are supplied with threshold level $V_1$ and thereby detect only the signal levels of the higher frequency components which exceed this threshold level. Consequently, noise signals are rejected and substantially only true signal levels of the higher frequency components pass through the coring circuits, as shown in FIG. 8B.

In one embodiment, each coring circuit is implemented by a subtractor which subtracts the threshold level $V_1$ from the signal supplied from a respective digital filter. If the threshold level $V_1$ exceeds the signal level from which this threshold level is subtracted, the coring circuit produces a substantially zero output. Thus, only those higher frequency components which exceed the threshold level pass through the coring circuits.

Preferably, threshold level $V_1$ is changed automatically as a function of the intensity of the total light level picked up by imaging device 2. Alternatively, this threshold level $V_1$ may be changed manually, as desired.

Peak detectors 43 are coupled to coring circuits 40 by gate circuits 41. As shown, the gate circuits are comprised of gates 41A, 41B, 41C and 41D adapted to selectively pass the signals produced at the outputs of coring circuits 40A, 40B, 40C and 40D, respectively. The gate circuits are supplied with gate enabling signals produced by auto-focus area setting circuit 24 to pass only those higher frequency components produced from the pixel elements of the checkerboard pattern that are disposed within the auto-focus area established by setting circuit 24. In a preferred embodiment, gates 41A and 41B are enabled, or opened, to pass the higher frequency components produced within larger focus detection area AE2 shown in FIG. 11A; and gates 41C and 41D are enabled to pass the higher frequency components produced from the pixel elements disposed within the smaller focus detection area AE1. As will be described, gates 41A and 41B are used when the lens is relatively far from its just-focused position; and gate circuits 41C and 41D are used when the lens is proximate its just-focused position.

Gates 41A-41D are further controlled to respond to a gate inhibit signal generated by auto-focus area setting circuit 24 when the luminance signal Y produced by imaging device 2 is too high. As mentioned above, if the scene being imaged by the video camera contains a portion with a very high brightness level, higher frequency components derived from the bright luminance signal may exhibit an excessively high amplitude. However, this high amplitude is due to discrete overly bright areas and not to sharp transitions in the luminance signal that otherwise are present when the lens is at its just-focused position. Consequently, if this high amplitude in the higher frequency components of the luminance signal is not blocked, errors will be made in the auto-focusing operation.

To prevent such errors, auto-focus area setting circuit 24 supplies a gate inhibit signal to gates 41A-41D in the event that the luminance signal Y exceeds a maximum threshold. A luminance detector 46 is coupled to luminance separator 32 to sense when the magnitude of the luminance signal exceeds a predetermined maximum threshold $V_2$. Hence, the gate circuits are disabled for the time period that the luminance signal exceeds this maximum threshold.

Figure 9A:
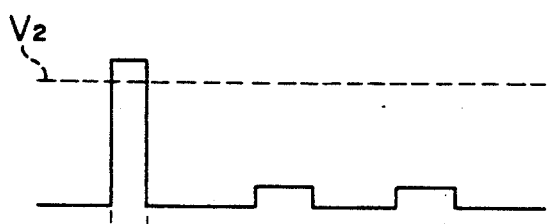
FIGS. 9A-9D are waveform diagrams which are useful in understanding another aspect of the present invention.
Figure 9B:
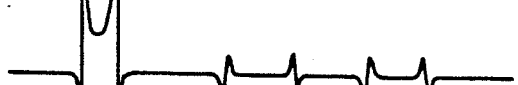

The function and advantages attained by luminance detector 46 may be appreciated from the waveform diagrams shown in FIGS. 9A-9D. FIG. 9A represents the luminance component produced by imaging device 2; and although analog signal levels are depicted, it will be appreciated that, in actuality, the signal levels are represented in digital form. FIG. 9A illustrates an example wherein the luminance signal level exceeds threshold $V_2$ during an interval T, as will occur when the imaging device images a scene with a very high brightness level, such as a scene that contains an object of high reflectivity, a bright light source, or the like. FIG. 9B represents the higher frequency components of the luminance signal that pass through the digital filter. It is appreciated that the amplitude of the higher frequency components produced when the luminance signal Y exceeds threshold $V_2$ is quite high and may provide false indications of the focus condition of the lens.

Figure 9C:
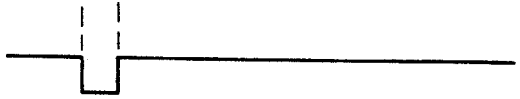
Figure 9D:
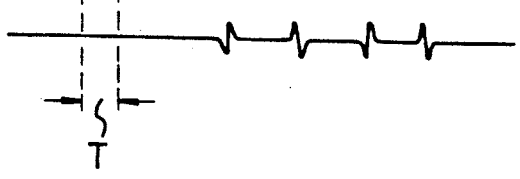

Luminance detector 46 generates an inhibit or masking signal of a duration equal to the duration T that the luminance signal Y exceeds threshold $V_2$. This masking signal is illustrated in FIG. 9C and is supplied to auto-focus area setting circuit 24 which responds thereto to generate a gate inhibit signal. Consequently, gates 41A-41D are closed, or inhibited, during this interval T; and the false higher amplitude components caused by the excessive brightness level in the luminance signal do not pass through the gate circuits. This selective operation of the gate circuits is illustrated in FIG. 9D, wherein the gate circuits are inhibited during interval T, the interval during which the luminance signal Y exceeds threshold $V_2$. Consequently, only the higher frequency components of non-excessive signal levels received from the coring circuits are passed by the gate circuits.

Alternatively, luminance detector 46 may function to sense when the luminance signal Y exceeds threshold $V_2$ and then subtract this luminance signal level from the luminance signal itself, thereby cancelling the brightness level. This "corrected" luminance signal then may be supplied to the digital filter.

Peak detectors 43 are comprised of peak detector circuits 43A, 43B, 43C and 43D which are coupled to gates 41A, 41B, 41C and 41D by switching circuits 42A, 42B, 42C and 42D, respectively. The switching circuits are selectively controlled by system controller 12 which applies switch control signals thereto via serial input port 28.

Each peak detector circuit, although formed as a digital circuit, operates to detect the peak level (i. e. the maximum level) in the signal supplied via the switching circuit connected thereto. In one embodiment, the switching circuit, such as switching circuit 42A, couples the output of gate 41A to peak detector circuit 43A for the duration of a video line interval, whereafter the switching circuit is opened and the peak detector circuit is reset. In this mode of operation, the peak level of the higher frequency components included in the luminance signal Y during each video line interval is detected.

Alternatively, switching circuit 42A may be closed for an entire vertical field interval. In that event, peak detector circuit 43A detects the peak (or maximum) level in the higher frequency components included in the luminance signal that is produced during a video field. At the end of a field interval, switching circuit 42A is opened and peak detector circuit 43A is reset in preparation to detect the peak level included in the next field interval.

The switching circuit, such as switching circuit 42A, also is operable to bypass peak detector circuit 43A so as to pass all peaks included in the higher frequency components provided at the output of coring circuit 40A and gate 41A (rather than passing only the maximum peak level included in the higher frequency component).

Integrators 45 are comprised of integrator circuits 45A, 45B, 45C and 45D coupled to peak detector circuits 43A, 43B, 43C and 43D by switching circuits 44A, 44B, 44C and 44D, respectively. The switching circuits are controlled by system controller 12 which supplies a control signal thereto via serial input port 28. Each switching circuit selectively exhibits a first state by which the output of a peak detector circuit is coupled to a respective integrator circuit, and another state by which the integrator circuit is bypassed. Each integrator circuit is adapted to sum the peaks supplied by the peak detector circuit connected thereto. In one embodiment, the peak (or maximum) level sensed by, for example, peak detector circuit 43A in each line of a field interval is summed by integrator circuit 45A to produce a focus detection signal whose magnitude is dependent upon (and, thus, is indicative of) the focus condition of the lens. In another embodiment, integrator circuit 45A is supplied with the peak, or maximum, level sensed by peak detector circuit 43A in a vertical field interval. The integrator circuit then sums the detected peaks that are sensed in a predetermined number of field intervals, such as the peaks that are detected in four successive field intervals. This too provides a focus detection signal whose magnitude is dependent upon the level of the higher frequency components included in the luminance signal which, in turn, is a function of the focus condition of the lens.

In yet another mode of operation, switching circuit 42A may be operated to bypass peak detector circuit 43A, thus supplying to integrator circuit 45A those higher frequency components which exceed threshold $V_1$ established by coring circuit 40A. Consequently, integrator circuit 45A sums a number of peak levels included in a field interval, provided those peak levels exceed the threshold $V_1$.

Figure 10:
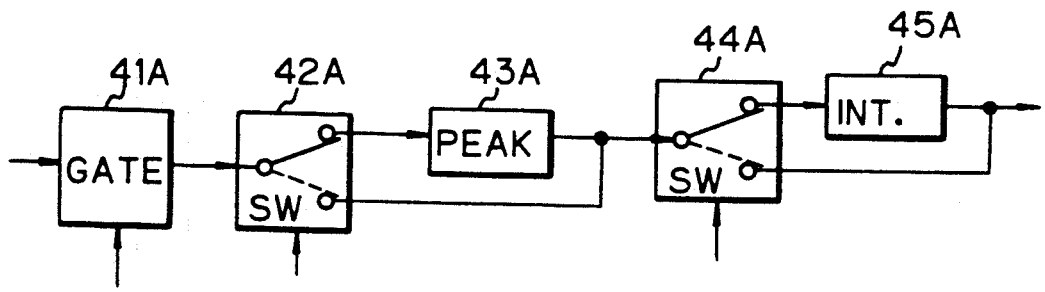
FIG. 10 is a partial block, partial schematic diagram of a portion of the optical detector shown in FIG. 4.

The foregoing alternative operating modes of peak detector circuit 43A and integrator circuit 45A will best be appreciated by referring to FIG. 10 which is a partial schematic, partial block diagram of these circuits interconnected by switching circuits 42A and 44A. Switching circuits 42A and 44A are schematically illustrated in FIG. 10 as two-position switches. In one position, shown in full lines, switching circuit 42A couples the output of gate 41A to peak detector circuit 43A, and in its other position, shown in broken lines, the switching circuit bypasses the peak detector circuit. Similarly, switching circuit 44A admits of a first position shown in full lines to couple the output of peak detector circuit 43A to integrator circuit 45A, and a second position shown in broken lines to bypass the integrator circuit. Switching circuits 42A and 44A are operable to establish the following modes:

(a) Both switching circuits 42A and 44A assume their first positions (as illustrated in full lines), and peak detector circuit 43A is reset at the end of each line interval, whereupon peak detector circuit 43A detects the peak (or maximum) level in the higher frequency components included in the luminance signal during each video line interval. Integrator circuit 45A sums the peak level detected in each line interval over a field duration.

(b) Switching circuit 42A assumes its first (full line) position and switching circuit 44A assumes its second (broken line) position, whereupon peak detector circuit 43A, which is reset at the end of each field interval, senses the peak level in a field interval; but integrator circuit 45A is bypassed. Hence, the detected peak level is not summed (or integrated) with other peak levels. It will be appreciated that the thus detected peak level in a field interval is an indication of the focus condition of the lens.

(c) Switching circuit 42A assumes its second (broken line) position while switching circuit 44A assumes its first (full line) position, whereupon all signal levels, including peaks, of the higher frequency components included in the luminance signal Y which exceed threshold $V_1$ established by coring circuit 40A are integrated over a field interval.

(d) Both switching circuits 42A and 44A assume their first (full line) positions; and peak detector circuit 43A is reset at the end of each field interval. Hence, the peak detector circuit detects the peak (or maximum) signal level in the higher frequency components over a video field interval. Integrator circuit 45A sums the detected peak levels for a predetermined number of fields, for example, the peak level in each of four successive fields, to produce the focus detection signal. In this mode of operation, the focus detection signal varies relatively slowly as compared to the other operating modes discussed above.

The signals provided at the outputs of integrator circuits 45A–45D comprise focus detection signals. The focus condition of lens group F4 is related to the magnitudes of these focus detection signals. System controller 12 is supplied with the focus detection signals by way of serial output port 29, from which a focus control signal is produced and supplied by way of driver 13 to focus motor 3 in FIG. 1.

The manner in which a focusing operation is carried out now will be described. Initially, let it be assumed that lens group F4 is at an out-of-focus position. For simplification, and to facilitate an understanding of the present invention, it is assumed that the focusing lens is at a position identified as i in FIG. 7. System controller 12 initially selects the filtering characteristics exhibited by filter processor 35; and selector circuits 39A and 39B are controlled to select filter processor 35 to derive the higher frequency components in the luminance signal. The selected higher frequency components are applied to gates 41A and 41B by coring circuits 40A and 40B. These coring circuits provide noise rejection in the manner discussed above and shown in FIGS. 8A and 8B. Hence, the coring circuits detect signal levels of the higher frequency components which exceed threshold $V_1$ and supply the detected signals to gates 41A and 41B, respectively.

In this initial condition, auto-focus area setting circuit 24 is controlled by system controller 12 to generate a gate enable signal corresponding to auto-focus area $AE_2$, shown in FIG. 11A. Accordingly, the detected signal produced by coring circuit 40A is gated to peak detector circuit 43A when the pixel elements of imaging device 2 which are included within auto-focus area $AE_2$ are scanned. Let it be assumed that peak detector circuit 43A detects the peak (or maximum) level of the detected signal during each video line interval. The detected peaks in those line intervals which are disposed within auto-focus area $AE_2$ are summed in integrator circuit 45A to produce a focus detection signal.

Coring circuit 40B, gate 41B, peak detector circuit 43B and integrator circuit 45B operate in the same way as just described. Hence, integrator circuit 45B produces a focus detection signal similar to that produced by integrator circuit 45A. Both of these focus detection signals are supplied serially to system controller 12. At this time, the signals that may be produced by integrator circuits 45C and 45D are ignored and, preferably, are not supplied to or utilized by the system controller.

In the preferred embodiment, the focus detection signal produced by one of a pair of integrator circuits, such as the focus detection signal produced by integrator circuit 45A, is used as a measure of the focus condition of the lens. The other focus detection signal (e. g. the focus detection signal produced by integrator circuit 45B) is used by the system controller to determine when a filter processor having sharper filtering characteristics should be selected. For example, as lens group F4 is driven toward its just-focused position, the magnitude of the focus detection signal derived by integrator circuit 45B from filter processor 35 changes at a rate which diminishes as the lens approaches its just-focused position. This diminished rate is attributed to the decrease in slope in the spectral characteristic 35' of filter processor 35, as illustrated in FIG. 7.

When lens group F4 reaches position ii (shown in FIG. 7), the sensed decrease in the rate of change of the focus detection signal derived from filter processor 35 and produced by integrator circuit 45B (as represented by the slope of curve 35' at 35ii) causes the system controller to operate selector circuits 39A and 39B to select filter processor 36 (having a narrower filter characteristic 36' in FIG. 7) for passing the higher frequency components included in the luminance signal Y. Coring circuits 40A and 40B now detect the signal levels of the higher frequency components supplied thereto from filter processor 36, and produce detected signals when these signal levels exceed threshold $V_1$. Thus, even though different filtering characteristics are selected for deriving the higher frequency components of the luminance signal, noise rejection nevertheless is carried out by the coring circuits. Gates 41A and 41B continue to gate the detected signals during the interval corresponding to auto-focus area $AE_2$; and peak detector circuits 43A and 43B detect the peak level in each video line. Integrator circuits 45A and 45B sum the peak signal in each line over a field interval to produce the focus detection signals. As before, the focus detection signal provided by integrator circuit 45A is used as a measure of the focus condition of the lens; and the focus detection signal provided by integrator circuit 45B is used by the system controller to determine when the filter characteristics should be changed over to a narrower characteristic. As before, a determination to change over to a narrower filter characteristic is made when the rate of change of the focus detection signal decreases.

Let it now be assumed that when the focus lens reaches position iii (shown in FIG. 7), the focus detection signal derived from filter processor 36 increases at a slower rate, as represented by the slope of curve 36' at 36iii. The system controller now selects filter processor 37, having the spectral characteristic 37' illustrated in FIG. 7, to derive the higher frequency components from the luminance signal Y. Selector circuits 39A and 39B now are changed over to couple the output of filter processor 37 to the coring, gate, peak detector and integrator circuits. These circuits operate in the manner described above to produce the focus detection signals.

Selector circuits 39A and 39B, coring circuits 40A and 40B, gates 41A and 41B, peak detector circuits 43A and 43B and integrator circuits 45A and 45B are used to produce focus detection signals within auto-focus area $AE_2$. Selector circuits 39C and 39D, coring circuits 40C and 40D, gates 41C and 41D, peak detector circuits 43C and 43D and integrator circuits 45C and 45D are used to produce the focus detection signals within auto-focus area $AE_1$. In one embodiment, auto-focus area setting circuit 24 supplies gate enable signals to at least gates 41A and 41B to define auto-focus area $AE_2$ for a predetermined time. It is appreciated from the foregoing discussion that during this time, the focusing lens is driven toward its just-focused position. At the expiration of this predetermined time, the auto-focus area setting circuit supplies gate enable signals to at least gates 41C and 41D to establish auto-focus area $AE_1$ (FIG. 11A). In an alternative embodiment, manual switches may be provided on the camera to permit the user to select auto-focus area $AE_1$ or $AE_2$. When focus detection signals are derived from the higher frequency components of the luminance signal produced when pixel elements within auto-focus area $AE_1$ are scanned, the outputs of integrator circuits 45A and 45B are ignored and, if desired, need not be supplied to system controller 12 by serial output port 29. Alternatively, if these signals are supplied to the system controller, they are not used thereby.

Selector circuits 39C and 39D are connected to filter processors 36 and 37 and also to high pass filter 38 and, under the control of system controller 12, they select the spectral characteristics of any one of these filtering circuits in the same manner as selector circuits 39A and 39B select the spectral characteristic of filter processor 35 or 36 or 37. For example, let it be assumed that shortly after the focusing lens reaches position iii of FIG. 7, at which point filter processor 37 was selected to derive the higher frequency components of the luminance signal, the aforementioned predetermined time interval expires. System controller 12 now selects selectors 39C and 39D, together with the circuits connected in cascade therewith, to produce the focus detection signals. Selectors 39C and 39D are controlled to select filter processor 37 for deriving the higher frequency components. Coring circuits 40C and 40D detect signal levels of these higher frequency components which exceed threshold $V_1$; and gates 41C and 41D gate the detected signals produced by the coring circuits to peak detector circuits 43C and 43D within auto-focus area $AE_1$. Peak detector circuits 43C and 43D detect the peak (or maximum) level in the gated, detected signal during each video line interval; and integrator circuits 45C and 45D sum the detected peaks in the line intervals disposed within auto-focus area $AE_1$. Hence, integrator circuits 45C and 45D produce focus detection signals in the same manner as discussed above in conjunction with integrator circuits 45A and 45B.

As the focusing lens group F4 continues to advance toward its just-focused position, system controller 12 changes over selector circuits 39C and 39D when the lens arrives at, for example, position iv (shown in FIG. 7). That is, the system controller senses that the rate of change of the focus detection signal produced by integrator circuit 45D has decreased and, thus, selector circuits 39C and 39D are changed over to select the narrowest spectral characteristic 38' which, in this embodiment, is exhibited by high pass filter 38.

The foregoing operation is repeated; and when the focus detection signal produced by integrator circuit 45C attains a predetermined level, system controller 12 determines that the focusing lens has reached its just-focused position. Accordingly, focus motor 3 (FIG. 1) is stopped.

Alternatively, system controller 12 may sense when the focus detection signal produced by integrator circuit 45C reaches its peak level (rather than reaching a predetermined level), whereupon the focus drive motor is stopped.

As mentioned above, to prevent spurious signal levels which may erroneously be present in the detected signal produced by the coring circuits due to very high brightness levels that may be present in the luminance signal Y, gates 41A–41D are disabled during those periods that such excessive brightness levels are present. Luminance detector 46 controls auto-focus area setting circuit 24 to produce a gate inhibit signal when excessive brightness levels are sensed, as discussed above in conjunction with FIGS. 9A–9D. Thus, integrator circuits 45A–45D function to integrate the detected peaks produced by peak detector circuits 43A–43D, except during those intervals when the luminance signal exceeds threshold $V_2$.

In the embodiment just described, the higher frequency components derived from selector circuits 39A and 39B are used to produce the focus detection signals for a predetermined time (e.g. during the scanning of pixels in auto-focus area $AE_2$), whereafter the higher frequency components derived by selector circuits 39C and 39D are used to produce the focus detection signals during the scanning of pixels within auto-focus area $AE_1$. Alternatively, selector circuits 39A and 39B may be selected to derive the higher frequency components within auto-focus area $AE_2$ until the rate of change of the focus detection signal produced by integrator circuit 45B is too slow (even after filter processors with narrower spectral characteristics have been selected by these selector circuits). Thereafter, selector circuits 39C and 39D are selected for deriving the higher frequency components from which the focus detection signals within auto-focus area $AE_1$ are produced. Other techniques may be used to change over from one auto-focus area to another and, accordingly, to change over from one set of selector circuits to another.

In the embodiment described above, selector circuits 39A and 39B are controlled to select the same filtering characteristics provided by the digital filter and, similarly, selector circuits 39C and 39D also are controlled to select the same filtering characteristics. Alternatively, selector circuit 39A may be controlled to select a filter characteristic having broader (or wider) spectral characteristics than the filter characteristic selected by selector circuit 39B. Likewise, selector circuit 39C may be controlled to select a frequency characteristic having broader spectral characteristics than the filter characteristic selected by selector circuit 39D. For example, when the focusing lens is at position i (shown in FIG. 7), selector circuit 39A selects the filtering characteristic 35' exhibited by filter processor 35, whereas selector circuit 39B selects the filtering characteristic 36' exhibited by filter processor 36. Hence, the focus detection signal produced by integrator circuit 45A is derived from filter processor 35 and the focus detection signal produced by integrator circuit 45B is derived from filter processor 36. As before, when system controller 12 senses that the rate of change of the focus detection signal produced by integrator circuit 45B from the higher frequency components passed by filter processor 36 is too slow, control signals are supplied from the system controller to selector circuits 39A and 39B by serial input port 28 such that selector circuit 39A now selects the filtering characteristics exhibited by filter processor 36 and selector circuit 39B now selects the filtering characteristics exhibited by filter processor 37. The foregoing operation then is repeated until, once again, the system controller senses that the rate of change of the focus detection signal produced by integrator circuit 45B is too slow. At that time, selector circuit 39A is changed over to select the filtering characteristics exhibited by filter processor 37.

Similarly, when the focus detection signals are derived from the higher frequency components in the luminance signal produced during the scanning of pixels in focus area $AE_1$, selector circuit 39C is controlled to select the filtering characteristics exhibited by filter processor 36 while selector circuit 39B is controlled to select the filtering characteristics exhibited by filter processor 37. As before, when system controller 12 senses that the rate of change of the focus detection signal produced by integrator circuit 45D is too slow, selector circuit 39C is changed over to select the filtering characteristics exhibited by filter processor 37 and selector circuit 39D is changed over to select the filtering characteristics exhibited by high pass filter 38. Further changeovers occur in the selection of the filtering characteristics as the focusing lens approaches its just-focused position, as described above.

As yet another alternative mode of operation, the selectors may be controlled such that each selects a predetermined filtering characteristic. For example, selector circuit 39A may select the filtering characteristic exhibited by filter processor 35, selector circuit 39B may select the filtering characteristic exhibited by filter processor 36, selector circuit 39C may select the filtering characteristic exhibited by filter processor 37 and selector circuit 39D may select the filtering characteristic exhibited by high pass filter 38. Assuming that the focusing lens is relatively distant from its just-focused position, auto-focus area $AE_2$ is used and gates 41A and 41B are enabled at intervals corresponding to this auto-focus area. Now, the focus detection signal produced by integrator circuit 45A is used by system controller 12 to determine the focus condition of the lens. The system controller also senses the rate of change of this focus detection signal; and when that rate decreases, selector circuit 39B is actuated to select the higher frequency components derived from the luminance signal by filter processor 36. Now, the focus detection signal produced by integrator circuit 45B is used as an indication of the focus condition of the lens.

System controller 12 controls selector circuits 39C and 39D in a manner similar to that just described when the focus detection signal is derived from auto-focus area $AE_1$.

In yet another operating mode, a pair of focus detection signals is used as a measure of the focus condition of the lens. For example, the focus detection signals produced by integrator circuits 45A and 45B are used in combination to sense the focus condition when pixels within auto-focus area $AE_2$ are scanned; and the focus detection signals produced by integrator circuits 45C and 45D are used as a measure of the focus condition during the scanning of pixels in auto-focus area $AE_1$. By using a pair of focus detection signals, erroneous indications attributable to artifacts or interference in one of the focus detection signals are avoided. For example, let it be assumed that the focusing lens is distant from its just-focused position; and let it be further assumed that selector circuit 39A is controlled to select the filtering characteristics exhibited by filter processor 35 and selector circuit 39B is controlled to select the filtering characteristics exhibited by filter processor 36. If an impulse or other interference is present on the focus detection signal produced by integrator circuit 45A, that interference could be erroneously interpreted by the system controller as indicating the focusing lens being much closer to its just-focused position. Responding to such false interpretation, the system controller may change over selector circuit 39A prematurely to select the filtering characteristics exhibited by filter processor 36 or even filter processor 37. Because of the narrow spectral characteristics exhibited by the newly selected filter processor, the amplitude of the focus detection signal derived therefrom may be too low for the system controller to determine the actual focus condition of the lens. However, since it is unlikely that similar interference will also be superimposed onto the focus detection signal produced by integrator circuit 45B, the system controller may compare the focus detection signals produced by integrator circuits 45A and 45B to conclude that the higher magnitude of one is not matched by the other and, thus, is artificial. Hence, the system controller may discriminate artifacts, noise or interference superimposed onto a focus detection signal, thus avoiding false indications of the lens focus condition.

From the foregoing, it is appreciated that, by changing the filtering characteristics used to derive higher frequency components from the luminance signal produced by the video camera imaging device as the focusing lens is driven toward its just-focused position, the lens may be focused quickly and accurately. Optimum filtering characteristics are selected as the lens approaches its just-focused position. Moreover, coring circuits 40 prevent erroneous focusing operations that may be attributed to noise signals which pass through the filter processors when a low contrast scene is being imaged. Also, focusing errors which otherwise may be due to the imaging of very bright areas are avoided. Higher frequency components having high amplitudes caused by such brightness areas are rejected and, thus, do not influence the focus detection signals produced by integrators 45.

Auto-Exposure Detector 22

Auto-exposure control is effected by suitably opening and closing iris 18 and by varying the gain of AGC circuit 8 (FIG. 1) so that the level of the luminance signal from an exposure detection area of CCD imaging device 2 may be maintained at a predetermined value.

Since the brightness level of the background of a scene which is back-lighted becomes very high, the overall luminance signal level is substantially elevated and, if the auto-exposure control is effected with reference to such overall luminance signal level, the aperture size of iris 18 will be decreased and a relatively low gain will be established for the AGC circuit. Consequently, the output of the video camera would cause objects in the foreground of the corresponding displayed image to appear dark and inconspicuous. On the other hand, when the scene is subjected to excessive lighting from in front (hereinafter referred to as excessive front-lighting), the brightness level of the background is low relative to the brightness of objects in the foreground and the overall luminance signal level is decreased so that, in response thereto, the iris is opened and the gain of the AGC circuit is increased with the result that the brightly illuminated objects in the foreground of the displayed image would be saturated.

Generally, the above problems encountered in effecting exposure control are avoided by dividing the image of a scene in the field of view of the video camera into a plurality of exposure detection areas whose positions and relative dimensions are controlled in accordance with lighting conditions, such as, normal front-lighting, back-lighting or excessive front lighting. Hence, at all times exposure control can be effected with reference to a luminance signal level detected for an exposure detection area which contains foreground objects for maintaining a predetermined luminance signal level in respect to such foreground objects.

Furthermore, if exposure control is effected with reference to an average of the luminance signal levels detected for a selected exposure detection area the detected luminance signal level will be undesirably low. For example, in the case of a standard signal, such as, a color bar, the average luminance signal level is approximately 30 percent of the peak level. As a result, if exposure control of a video camera is carried out with a control signal obtained by average-detecting the luminance signal, the entire display screen is liable to appear dark. Therefore, it is desirable to effect exposure control with reference to a detected luminance signal value that is closer to the peak value of the luminance signal levels in the exposure detection area than it is to the average of the luminance signal levels in such detection area.

A digital luminance signal level detector circuit is provided with peak detector circuits for detecting peak values of the digital signal and with average value detector circuits for detecting average values of the digital signal. Outputs of the peak detector circuits and outputs of the average value detector circuits are suitably weighted and added for desirably indicating a detected luminance signal level that can be advantageously used for auto-exposure control.

More specifically, as shown in FIG. 4, in the auto-exposure detector 22 the luminance component Y from luminance separator 32 is supplied to a so-called "knee" circuit 51 and to one input of a comparator 52. A comparison level signal, for example, of the level $V_3$ (FIG. 13B), is supplied to another input of comparator 52 through serial input port 28 from system controller 12.

An output of filter processor 37 is supplied to peak detector circuits 54A and 54B through gate circuits 53A and 53B, respectively. The output of filter processor 37 which is supplied to gate circuits 53A and 53B is a luminance signal from which a high frequency range noise component has been removed by a low-pass filter. Thus, accurate detection of the peaks therein in the luminance component is attained. Since a digital high-pass filter based on a digital averaging low-pass filter is composed of delay circuit 34 and filter processor 37, both a high-pass filter output, for example, to be applied to selector circuits 39A–39D, and a low-pass filter output, for example, to be applied to gate circuits 53A and 53B, can be readily extracted from filter processor 37.

Gate circuits 53A and 53B are supplied with gate enabling signals from auto-exposure detection area setting circuit 25 under the control of system controller 12 for selectively opening and closing gate circuits 53A and 53 and thereby defining a plurality of exposure detection areas, for example, as at $AE_1$ and $AE_2$ in FIG. 11A, or as at $AE'_1$ and $AE'_2$ in FIG. 11B.

Figure 12:
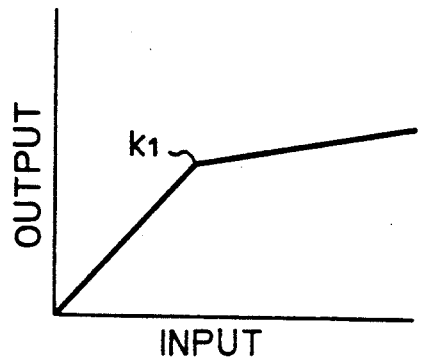
FIG. 12 is a graphical representation of the transfer characteristic of a circuit used for auto-exposure control in the optical detector of FIG. 4.

As is shown in FIG. 12, knee circuit 51 exhibits a non-linear characteristic, that is, a characteristic comprised of two relatively straight portions with different slopes joined at the knee $k_1$. The output of knee circuit 51 is supplied through gate circuits 55A and 55B to integrator circuits 56A and 56B, respectively. Gate circuits 55A and 55B are also supplied with a gate enabling signal from auto-exposure detection area setting circuit 25 for defining the exposure detection areas $AE_1$ and $AE_2$ or $AE'_1$ and $AE'_2$. It will be apparent that integrator circuits 56A and 56B detect averages of the luminance signal levels in the digital luminance component Y supplied to the integrator circuits when the respective gate circuits 55A and 55B are open or enabled. In the absence of knee circuit 51, if an average of the luminance signal level is detected by integrator circuit 56A or 56B during the interval in which the respective gate circuit 55A or 55B is open, the averaged output may be increased by a high brightness occurring at even a relatively small area within the respective exposure detection area, with the result that the auto-exposure control causes the entire picture output by the video camera to have an undesirably dark appearance.

Figure 15A:
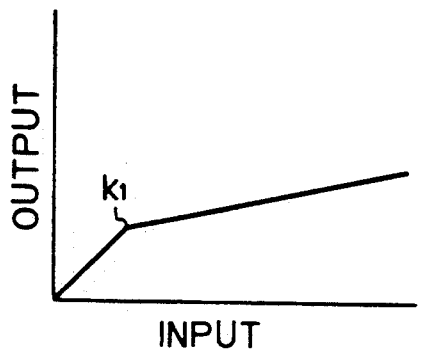
FIGS. 15A and 15B represent the manner in which the transfer characteristic shown in FIG. 12 may be varied for different image conditions.
Figure 15B:
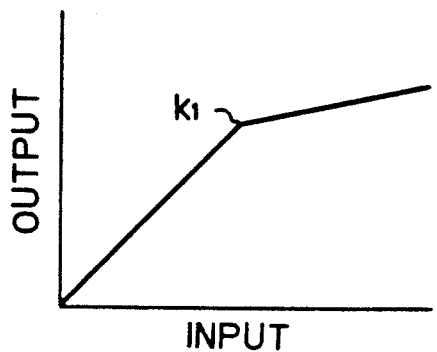

However, by the presence of knee circuit 51, the gain of the high brightness portion is decreased so that the averaged output is not unduly influenced thereby. A characteristic setting signal is supplied from system controller 12 through serial input port 28 to the knee circuit for varying the turning point or knee $k_1$ of the characteristic curve thereof, for example, between the positions shown on FIGS. 15A and 15B, respectively.

Comparator 52 detects those samples of the digital luminance component Y from luminance separator 32 which have levels above the comparison level $V_3$ supplied to comparator 52 from the system controller. The resulting comparison output of comparator 52 is supplied through gate circuits 57A and 57B to distribution detectors 58A and 58B. The distribution detectors count the numbers of samples of the digital luminance signal having levels above the predetermined brightness level $V_3$ during intervals when gate circuits 57A and 57B are respectively enabled or open. The gate circuits are provided with gate enabling signals from auto-exposure detection area setting circuit 25 for defining the exposure detection areas.

Figure 13A:
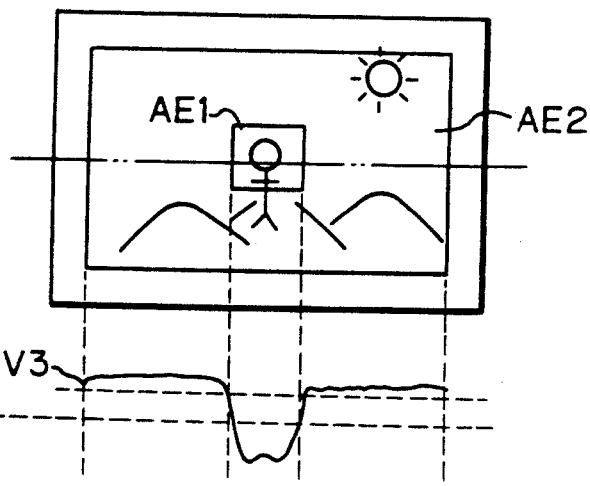
FIGS. 13A and 13B are useful in understanding the operation of auto-exposure control when a scene being imaged is back-lighted.
Figure 13B:
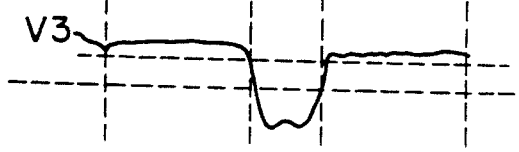

The distribution of the luminance signal levels over the scene in the field of view of the video camera can be determined from the outputs of distribution detectors 58A and 58B. For example, when a picture or scene in the field of view of the video camera is back-lighted, as illustrated in FIG. 13A, high level luminance signal portions are distributed mostly over the background or peripheral portions of the picture, while relatively low level luminance signal portions, for example, corresponding to a back-lighted object in the foreground of the picture, are distributed mostly in the central portion thereof, as shown in FIG. 13B. Such distribution of the high-level luminance signal portions can be determined from the count value constituting the output H1 of distribution detector 58A and indicating the number of samples having a luminance level above the predetermined level $V_3$, for example, in the exposure detection area $AE_1$, and from the count value constituting the output H2 of distribution detector 58B and which indicates the number of samples having luminance signal levels above the predetermined level $V_3$, for example, in the exposure detection area $AE_2$. Such count values or outputs H1 and H2 from distribution detectors 58A and 58B are supplied to system controller 12.

Outputs $P_1$ and $P_2$ representing luminance signal peak values for the selected exposure detection areas, such as the areas $AE_1$ and $AE_2$, are obtained from peak detectors 54A and 54B, respectively, and are supplied through serial output port 29 to the system controller. Similarly, outputs $IN_1$ and $IN_2$ representing the integrated values or averages of the luminance signal levels in the selected exposure detection areas are obtained from integrator circuits 56A and 56B, respectively, and are supplied to the system controller.

If auto-exposure control is effected with reference only to an average of the detected luminance signal levels, for example, as obtained at the outputs $IN_1$, and $IN_2$ of integrator circuits 56A and 56B, the resulting exposure control is defective as the average detected level is undesirably low. Since desirable auto-exposure control is performed with reference to a detected luminance signal level which is nearer to the detected peak luminance signal level than to the average of the detected luminance signal levels, in a preferred embodiment auto-exposure control is effected with reference to a detected luminance signal level which is obtained by appropriately mixing average and peak values as derived from integrator circuits 56A and 56B and from peak detectors 54A and 54B, respectively.

Figure 14:
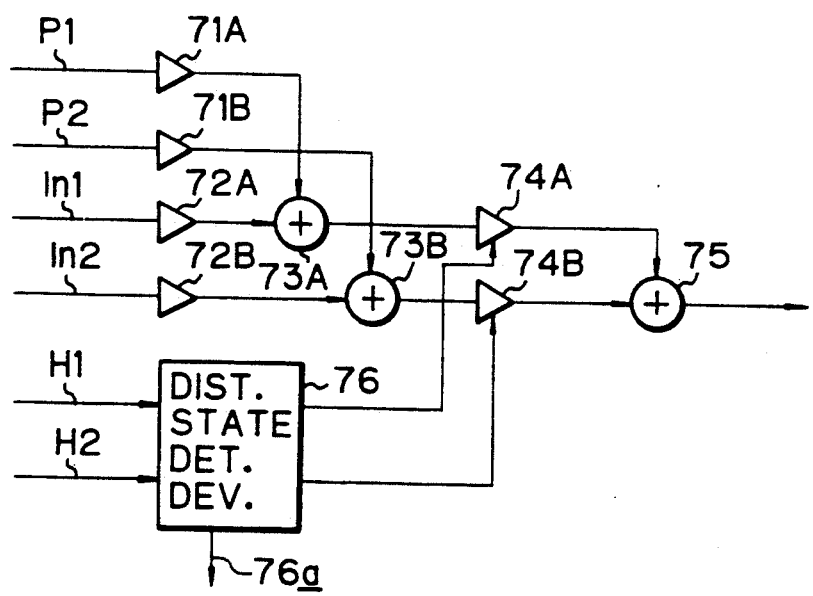
FIG. 14 is a schematic representation of a circuit that may be used with the auto-exposure control portion of the optical detector shown in FIG. 4.

In order to effect such mixing, and as shown in the functional block diagram of FIG. 14, the peak values $P_1$ and $P_2$ output by peak detector circuits 54A and 54B and the average or integrated values $IN_1$ and $IN_2$ output by integrator circuits 56A and 56B are applied to multipliers 71A, 71B, 72A and 72B, respectively, to be multiplied therein by suitable coefficients. The resulting modified or multiplied outputs of multipliers 71A and 72A are added to each other in an adder 73A, and the outputs of multipliers 71B and 72B are similarly added to each other in an adder 73B. It will be appreciated that, by suitably selecting the coefficients employed in multipliers 71A and 71B as compared with the coefficients employed in multipliers 72A and 72B, the outputs of adders 73A and 73B can be provided with detection characteristics that are near to peak detection of the luminance signal levels in respective exposure detection areas $AE_1$ and $AE_2$, or $AE'_1$ and $AE'_2$. Obviously, by changing the coefficients employed in multipliers 71A and 71B and in multipliers 72A and 72B, the detection levels can be varied. Since these computations are readily carried out by software, the detection levels can be easily changed.

On the basis of the value obtained by appropriately weighting and adding the detected value of the luminance signal level in respective exposure detection areas, opening and closing of iris 18 and changing of the gain of AGC circuit 8 are suitably controlled.

More particularly, as shown in FIG. 14, the outputs of adders 73A and 73B are supplied to multipliers 74A and 74B, respectively, and the outputs of multipliers 74A and 74B are added to each other in an adder 75, with the added output of the latter being applied to system controller 12 as the exposure detection signal for determining the opening and closing of iris 18 and the gain of AGC circuit 8. It is to be noted that multipliers 74A and 74B are provided for suitably weighting the detection value of the luminance signal level in one of the exposure detection areas, for example, the central area $AE_1$, and for weighting the detection value of the luminance signal level in the other exposure detection area, for example, the peripheral area $AE_2$. The weighting of the detection values in multipliers 74A and 74B, respectively, is desirably dependent on the lighting conditions, for example, on whether the scene in the field of view of the video camera is being subjected to normal forward-lighting, back-lighting or excessive forward-lighting, as determined from the outputs $H_1$ and $H_2$ of distribution detectors 58A and 58B, respectively.

In respect to the foregoing, it will be noted that normal forward-lighting of a scene in the field of view of the video camera results in substantially uniform brightness throughout the picture, that is, distribution of the luminance signal level in one exposure detection area, which usually contains the principal object or objects, is substantially equal to that in the other exposure detection area, which contains the background of the picture. In other words, in the case of normal forward-lighting of the scene, the difference between the output $H_1$ of the distribution detector 58A and the output $H_2$ of the distribution detector 58B is not large.

On the other hand, when the scene in the field of view of the video camera is back-lighted, the background of the picture is extremely bright relative to objects in the foreground so that luminance signal levels above the predetermined value $V_3$ are mostly distributed in the peripheral or upper exposure detection area. In other words, in the case of back-lighting, the output $H_2$ from the distribution detector 58B is large relative to the output $H_1$ from the distribution detector 58A.

Moreover, in the case of excessive forward-lighting of the scene in the field of view of the video camera, the background is dark relative to the very brightly lighted objects in the foreground. Therefore, in the case of excessive forward-lighting, luminance signal levels above the predetermined value $V_3$ are mostly distributed in the exposure detection area where the brightly illuminated objects are located, with the result that the output $H_1$ of the distribution detector 58A is then large relative to the output $H_2$ of the distribution detector 58B.

As shown in FIG. 14, the outputs $H_1$ and $H_2$ of the distribution detectors 58A and 58B are supplied to a brightness distribution state determining device 76 which, on the basis of a comparison of the outputs $H_1$ and $H_2$ relative to each other, determines whether the scene in the field of view of the video camera is being subjected to normal forward-lighting, back-lighting or excessive forward-lighting and, in response to such determination, provides corresponding outputs to the multipliers 74A and 74B for controlling or varying the coefficients employed therein.

More specifically, when the output $H_2$ is substantially greater than the output $H_1$ and the device 76 determines therefrom that the scene in the field of view of the video camera is subjected to back-lighting, the coefficient of the multiplier means 74A for weighting the detection luminance signal level of the portion of the picture containing the principal objects is set to a large value, while the coefficient of the multiplier 74B for weighting the detection luminance signal level of the background portion is set to a relatively small value. On the other hand, when the output $H_1$ is substantially larger than the output $H_2$ and the device 76 determines therefrom that the scene in the field of view of the video camera is subjected to excessive forward-lighting, the coefficient of multiplier 74A for weighting the brightness of the object portion is set to a relatively small value and the coefficient of the multiplier 74B for weighting the brightness of the background portion is set to a relatively large value. As a result of the foregoing, the auto-exposure control approximates center-emphasized photometry, and optimum auto-exposure control is achieved even when the scene is subjected to back-lighting or excessive forward-lighting.

Further, the brightness distribution state determining device 76 is effective, in response to the outputs $H_1$ and $H_2$ from the distribution detectors 58A and 58B, to determine the positions and dimensions of the exposure detection areas, that is, to determine whether the exposure detection areas $AE_1$ and $AE_2$ (FIG. 11A) or the exposure detection areas $AE'_1$ and $AE'_2$ (FIG. 11B), are to be employed.

More specifically, in the case of normal forward lighting, that is, when the difference, if any, between the outputs $H_1$ and $H_2$ is not large, the distribution state determining device 76 provides an output at 76a to the system controller 12 by which the latter selects the arrangement of upper and lower exposure detection areas, shown in FIG. IIA, that is, the arrangement in which the image projected on the CCD imaging device 8 is divided into one exposure detection area extending laterally across the lower portion of the entire image so as to contain the principal foreground objects, and another exposure detection area disposed vertically above the firs area and also extending across the entire width of the image for containing the background. When these exposure detection areas are selected in response to the normal forward-lighting of the scene, no variation occurs in the brightness as a principal object moves laterally or in response to panning of the video camera. This may be contrasted with the arrangement of FIG. 11A in which, in response to panning of the camera or movement of the object, the object will move laterally out of the centrally located exposure detection area.

When the scene in the field of view of the video camera is subjected to back-lighting or excessive forward-lighting, the resulting relatively large difference between the outputs $H_1$ and $H_2$ causes the distribution state determining device 76 to provide its output 76a with a level indicating to the system controller that back-lighting or excessive front-lighting has occurred, whereupon the system controller selects the exposure detection areas $AE_1$ and $AE_2$ shown in FIG. 11A. Thus, as previously noted, in the back-lighted and excessive forward-lighted conditions, the exposure detection area $AE_1$ which would contain a principal object is located at the center, whereas the exposure detection area $AE_2$ constitutes the peripheral portion and would contain the background. Apart from the different locations of the exposure detection areas in FIG. 11A as compared with those in FIG. 11B, it will be apparent that the exposure detection area $AE_1$ surrounded by the exposure detection $AE_2$ is of a substantially smaller size than the latter, whereas the exposure detection area $AE'_1$ is of a size that is at least as large as, or even slightly larger than the exposure detection area $AE'_2$ in FIG. 11B. Due to the relatively smaller size of the centrally located exposure detection area $AE_1$, the exposure control effected with the exposure detection areas $AE_1$ and $AE_2$ of FIG. 11A approximates the desired center-emphasized photometry.

The output of the brightness distribution state determining device 76 may also be used by the system controller for controlling the turning point or knee $k_1$ of knee circuit 51. More particularly, when device 76 determines from the outputs $H_1$ and $H_2$ that the scene in the field of view of the video camera is back lighted, the turning point $k_1$ is shifted downwardly, for example, to the position shown in FIG. 15A. By reason of such downward shifting of the characteristic curve of the knee circuit 51, the luminance detection signal corresponding to the high brightness of the background due to the back-lighting will be subjected to a reduced gain in the knee circuit so that the resulting exposure control will ensure that objects in the foreground do not appear dark in the back-lighted condition. On the other hand, when the distribution state detecting device 76 senses from the outputs $H_1$ and $H_2$ that the scene in the field of view of the video camera is subjected to excessive forward-lighting, the turning point $k_1$ of knee circuit 51 is raised, for example, to the position shown on FIG. 15B. Thus, in the excessive forward-lighting condition, the gain of the knee circuit is increased in respect to the luminance detection signal corresponding to the objects of high brightness appearing in the foreground of the excessively forward-lighted scene. By reason of the corresponding increase in the exposure control signal the opening of iris 18 and the gain of AGC circuit 8 are reduced for ensuring that the principal objects in the foreground of the picture do not saturate when subjected to excessive forward-lighting.

It will be apparent from the foregoing that, in effect, the gain of the entire control system is set by the brightness distribution state determining device 76, that is, by changing the position of the knee $k_1$ of knee circuit 51 as described above, and, as a result thereof, undesirable darkness of a principal object in the foreground of a back-lighted scene, and saturation of principal objects in the foreground of an excessively forward-lighted scene, are avoided.

It will be further appreciated that not all of the controls responsive to the back-lighting and excessive forward-lighting conditions are required. In other words, the problems associated with the back-lighting and excessive forward-lighting can be substantially avoided by employing one or more of the controls described above.

Automatic White Balance Detector 23

Figure 16A:
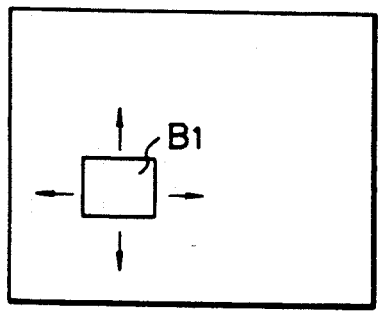
FIGS. 16A and 16B are useful in understanding the manner in which the white balance detector included in the optical detector of FIG. 4 operates.
Figure 16B:
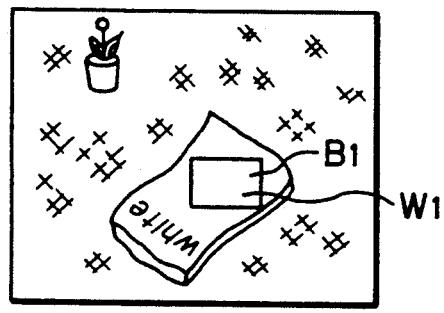

White balance control is generally carried out by controlling the levels of red (R), green (G) and blue (B) color signals so as to maintain a predetermined ratio thereof when viewing a white object or area. In the illustrated video camera, it is also possible to perform either fully automatic white balance control or so-called "one-push" auto white balance control. The fully automatic white balance control performs such control with reference to the integrated value of the entire picture which, for the purposes of the control, is assumed to be white. On the other hand, the one-push auto white balance control employs a white balance detection area $WB_1$ (FIG. 16A) which can be varied both in position and dimensions. Thus, the white balance detection area $WB_1$ can be located on a white part $W_1$ of an object in the scene in the field of view of the video camera, as on FIG. 16B whereupon, in response to actuation or pushing of an auto white balance setting button (not shown), white balance control is carried out on the basis of a signal derived during scanning of the white balance detection area $WB_1$.

Since the position and dimensions of the white balance detection area $WB_1$ can be changed as desired under the control of system controller 12, the white balance control can be effected with reference to a white portion of any object, such as, clothes or the like, appearing in the scene in the field of view of the camera. Therefore, it is not necessary to perform white balance adjustment with reference to a white cap inconveniently placed over the lens, or with reference to a "standard" white card, or the like. White balance control with reference to a white portion of an object in the field of view of the video camera ensures more precise white balance adjustment than that achieved when white balance is effected with reference to the integrated value of the entire picture which is assumed to be white.

In effecting the one-push auto white balance control as generally described above, a plurality of white balance detection areas may be set or defined, and then the one of those white balance detection areas which approximates a so-called black body radiation curve is selected for actual use in achieving white balance control.

As shown in FIG. 4, in the automatic white balance detector 23, the luminance signal Y from the luminance separator circuit 32 is supplied through a gate circuit 61A to an integrator circuit 62A. The chrominance signals $C_R$ and $C_B$ from the chrominance separator circuit 33 are supplied through gate circuits 61B and 61C to integrator circuits 62B and 62C, respectively. Outputs of the integrator circuits 62A, 62B and 62C are supplied, as automatic white balance detection signals, to the system controller 12 through the serial output port 29. The gate circuits 61A, 61B and 61C are supplied with gate enabling signals from the automatic white balance detection area setting circuit 26 for defining each white balance detection area. In the fully automatic white balance control mode, the white balance detection area is set by circuit 26 to be substantially coextensive with the image projected on CCD imaging device 8. In the one-push auto white balance control mode, the location and dimensions of the white balance detection area $WB_1$ are variably determined and set by circuit 26 so as to correspond with a white part of the image projected on the CCD imaging device.

The system controller performs the following calculations on the integrated values IN(Y), IN($C_R$) and IN($C_B$) of the luminance signal Y and the chrominance signals $C_R$ and $C_B$, derived from the integrator circuits 62A, 62B and 62C, respectively.

By subtracting integrated values IN($C_R$) and IN($C_B$) of the chrominance signals $C_R$ and $C_B$ from the integrated value IN(Y) of the luminance signal Y, an integrated value IN(G) of the green (G) color signal is obtained as follows:

$$IN(Y) - IN(C_R) - IN(C_B) = IN(3G + 2R + 2B) -$$
$$IN(2R - G) - IN(2B - G)$$
$$= IN(5G)$$

By adding the integrated value IN($C_R$) of the chrominance signal $C_R$ and the integrated value IN(G) of the green (G) color signal obtained in the foregoing process, integrated value IN(R) of the red (R) color signal is obtained as follows:

$$IN(C_R)+IN(G)=IN(2R-G)+IN(G)=IN(2R)$$

By adding the integrated value IN($C_B$) of the chrominance signal $C_B$ and the integrated value IN(G) of the green (G) color signal obtained in the foregoing process, integrated value IN(B) of the blue (B) color signal is obtained as follows:

$$IN(C_B)+IN(G)=IN(2B-G)+IN(G)=IN(2B)$$

The integrated values of the levels of the three-component color signals R, G and B obtained, as above, in the system controller 12 are communicated through a connection 12a to the processor 10, and employed in the latter, as in a conventional white balance control circuit, for determining the gains of the respective three-component color signals R, G and B that may be derived from the luminance and chrominance signals at the output terminals 16A and 16B (FIG. 1) so as to maintain a predetermined ratio of the levels of the three-component color signals R, G and B.

It will be appreciated from the above detailed description that, in accordance with this invention, there is provided a video camera having digital auto-focus, auto-exposure and auto-white balance controls all under the control of a common system controller with common input and output serial ports which are connected with auto-focus, auto-exposure and auto-white balance sections of a common optical detector circuit.

Although a preferred embodiment of the present invention and modifications thereof have been described in detail herein with reference to the accompanying drawings, it is to be understood that the invention is not limited to such embodiment and modifications, and that various changes and further variations could be effected therein by one skilled in the art without departing from the scope or spirit of the invention as defined in the appended claims.

What is claimed is:

1. A method of generating a focus detection signal from a video signal produced by a video camera, comprising the steps of: deriving higher frequency components of said video signal; detecting signal levels of said higher frequency components which exceed a minimum threshold to produce a detected signal; sensing when the video signal produced by said video camera exceeds a maximum threshold; integrating said detected signal, and inhibiting the integrating of said detected signal when said video signal exceeds said maximum threshold, to produce a focus detection signal.

2. The method of claim 1 wherein said video signal comprises a luminance signal.

3. The method of claim 2 wherein said step of deriving higher frequency components comprises filtering intermediate and higher frequencies of said luminance signal.

4. A method of generating a focus detection signal from a video signal which includes a luminance signal and is produced by a video camera, comprising the steps of: deriving higher frequency components of said video signal by filtering intermediate and higher frequencies of said luminance signal; detecting signal levels of said higher frequency components which exceed a minimum threshold by establishing said minimum threshold at a level greater than an expected noise signal level included in said luminance signal when said video camera images a scene with relatively little contrast changes therein, and subtracting the established minimum threshold from the level of the filtered intermediate and higher frequencies, thereby producing a detected signal; sensing when the video signal produced by said video camera exceeds a maximum threshold; and integrating said detected signal, except during an interval when said video signal exceeds said maximum threshold, to produce a focus detection signal.

5. A method of generating a focus detection signal from a video signal which includes a luminance signal and is produced by a video camera, comprising the steps of: deriving higher frequency components of said video signal by filtering intermediate and higher frequencies of said luminance signal; detecting signal levels of said higher frequency components which exceed a minimum threshold to produce a detected signal; sensing when the video signal produced by said video camera exceeds a maximum threshold; gating said detected signal during fixed periods which define an auto-focus area in a scene being imaged by said video camera to pass said detected signal; integrating the detected signal which is passed; and inhibiting said integrating during an interval when said video signal exceeds said maximum threshold, to produce a focus detection signal.

6. The method of claim 5 wherein said step of integrating the detected signal which is passed comprises integrating peak levels of the detected signal which is passed.

7. The method of claim 5 wherein said step of integrating said detected signal further comprises disabling the gating of said detected signal during said interval when said video signal exceeds said maximum threshold, thereby blocking the passage of said detected signal.

8. The method of claim 7 wherein the step of sensing when the video signal produced by said video camera exceeds said maximum threshold comprises comparing said luminance signal to said maximum threshold and producing a gate disabling signal for the interval that said luminance signal exceeds said maximum threshold.

9. A method of generating a focus detection signal from a video signal which includes a digital luminance signal and is produced by an image pickup device of a camera, comprising the steps of: deriving higher frequency components by digitally filtering intermediate and higher frequencies of said luminance signal; detecting signal levels which exceed a minimum threshold by establishing said minimum threshold at a level greater than an expected noise signal level included in said luminance signal when said camera images a scene with relatively little contrast changes therein, and subtracting the established minimum threshold from the level of the filtered intermediate and higher frequencies, thereby producing a detected signal; and integrating the detected signal to provide a focus detection signal.

10. A method of generating a focus detection signal from a video signal which includes a digital luminance signal and is produced by an image pickup device of a camera, comprising the steps of: deriving higher frequency components by digitally filtering intermediate and higher frequencies of said luminance signal; detecting signal levels of the higher frequency components which exceed a minimum threshold to produce a detected signal; gating said detected signal during fixed periods which define an auto-focus area in a scene being imaged by said camera to pass said detected signal; and integrating the detected signal which is passed to provide a focus detection signal.

11. The method of claim 10 wherein said step of integrating the detected signal which is passed comprises integrating peak levels of the detected signal which is passed.

12. A method of generating a focus detection signal from a video signal produced by an image pickup device of a camera, comprising the steps of: deriving higher frequency components of the video signal; gating said higher frequency components during fixed periods which define an auto-focus area in a scene being imaged by said camera to pass said higher frequency components; and integrating the higher frequency components which are passed except during an interval when the video signal produced by the image pickup device exceeds a maximum threshold.

13. The method of claim 12 wherein said step of integrating the higher frequency components which are passed comprises integrating peak levels of the higher frequency components which are passed.

14. The method of claim 12 wherein said step of integrating further comprises disabling the gating of said higher frequency components during said interval when said video signal exceeds said maximum threshold, thereby blocking the passage of said higher frequency components.

15. A method of generating a focus detection signal from a video signal produced by an image pickup device of a camera, comprising the steps of: deriving higher frequency components of the video signal; detecting when the video signal produced by the image pickup device exceeds a maximum threshold; defining an interval during which the video signal produced by the image pickup device exceeds said maximum threshold; integrating said higher frequency components; and inhibiting the integration of said higher frequency components during the defined interval.

16. The method of claim 15 wherein the step of inhibiting the integration of said higher frequency components comprises blocking said higher frequency components from being supplied to integrating means during the defined interval.

17. Apparatus for generating a focus detections signal from a video signal produced by a video camera, comprising: filter means for deriving higher frequency components of said video signal; detecting means for detecting signal levels of said higher frequency components which exceed a minimum threshold to produce a detected signal; sensing means for sensing when the video signal produced by said video camera exceeds a maximum threshold; integrating means for integrating said detected signal; and means for inhibiting said integrating when said video signal exceeds said maximum threshold, to produce a focus detection signal.

18. The apparatus of claim 17 wherein said video signal comprises a luminance signal.

19. The apparatus of claim 18 wherein said detecting means comprises threshold means for establishing said minimum threshold at a level greater than an expected noise signal level included in said luminance signal when said video camera images a scene with relatively little contrast changes therein; and means for subtracting the established minimum threshold from the higher frequency components of the video signal, thereby producing said detected signal.

20. An apparatus for generating a focus detection signal from a video signal which includes a luminance signal and is produced by a video camera, comprising filter means for deriving higher frequency components of said video signal; detecting means for detecting signal levels of said higher frequency components which exceed a minimum threshold to produce a detected signal; sensing means for sensing when the video signal produced by said video camera exceeds a maximum threshold; gating means for gating said detected signal during fixed periods which define an auto-focus area in a scene being imaged by said video camera; and means for integrating the gated detected signal, except during an interval when said video signal exceeds said maximum threshold, to produce a focus detection signal.

21. The apparatus of claim 20 wherein said means for integrating comprises peak integrating means for integrating peak levels of the gated detected signal.

22. The apparatus of claim 20 further comprising disabling means for disabling the gating means during said interval when said video signal exceeds said maximum threshold.

23. The apparatus of claim 22 wherein said sensing means comprises comparator means for comparing said luminance signal to said maximum threshold to produce a gate disabling signal and to supply said gate disabling signal to said disabling means for the interval that said luminance signal exceeds said maximum threshold.

24. An apparatus for generating a focus detection signal from a digital video signal which includes a luminance signal and is produced by an image pickup a camera, comprising: digital filter means coupled to receive said luminance signal and to separate intermediate and higher frequency components therefrom; threshold means for establishing a minimum threshold at a level greater than an expected noise signal level included in said luminance signal when said camera images a scene with relatively little contrast changes therein; means for subtracting said minimum threshold from the separated intermediate and higher frequency components, thereby producing a detected signal; and integrating means for integrating the detected signal to provide a focus detection signal.

25. An apparatus for generating a focus detection signal from a digital video signal which includes a luminance signal and is produced by an image pickup device of a camera, comprising: digital filter means coupled to receive said luminance signal and to separate intermediate and higher frequency components therefrom; detecting means for detecting signal levels of the higher frequency components which exceed a minimum threshold to produce a detected signal; gating means for gating said detected signal during fixed periods which define an auto-focus area in a scene being imaged by said camera; and means for integrating the gated detected signal to provide a focus detection signal.

26. The apparatus of claim 25 wherein said means for integrating comprises peak integrating means for integrating peak levels of the gated detected signal.

27. An apparatus for generating a focus detection signal from a digital video signal which includes a luminance signal and is produced by an image pickup device of a camera, comprising: digital filter means coupled to receive said luminance signal and to separate intermediate and higher frequency components therefrom; means for gating said intermediate and higher frequency components during fixed periods which define an auto-focus area in a scene being imaged by said video camera; and means for integrating the gated intermediate and higher frequency components except during an interval when the digital video signal produced by the image pickup device exceeds a maximum threshold value.

28. The apparatus of claim 27 wherein said means for integrating comprises peak integrating means for integrating peak levels of the gated intermediate and higher frequency components.

29. The apparatus of claim 27 wherein said integrating means further comprises disabling means for disabling the gating means during said interval when said video signal exceeds said maximum threshold.

30. An apparatus for generating a focus detection signal from a digital video signal produced by an image pickup device of a camera, comprising: digital filter means for deriving higher frequency components of the video signal; detecting means for detecting when the digital video signal produced by the image pickup device exceeds a maximum threshold value; means for defining an interval during which the digital video signal produced by the image pickup device exceeds said maximum threshold value; means for integrating said higher frequency components; and means for inhibiting the means for integrating said higher frequency components during the defined interval.

31. The apparatus of claim 30 wherein said means for inhibiting comprises means for blocking said higher frequency components from being supplied to said means for integrating during the defined interval.

32. Apparatus for controlling the optical focusing of adjustable lens means in a video camera, comprising:
filter means exhibiting plural filter characteristics ranging from relatively broad to relatively narrow spectral characteristics, for deriving higher frequency components of a video signal produced by said video camera;

focus detection means coupled to said filter means for generating a focus detection signal from the higher frequency components derived by said filter means, said focus detection signal representing the focus condition of said lens means;

lens drive means responsive to said focus detection signal for driving said lens means toward a just-focused condition;

sense means for sensing the rate at which said focus detection signal changes and generating a sensed focus detection signal, means for detecting when the rate of change of said focus detection signal is too slow for selecting a filter characteristic having a narrower spectral characteristic; and selection means for selecting from said filter means a filter characteristic having a narrower spectral characteristic as said lens means approaches said just-focused condition in response to said sensed focus detection signal.

33. Apparatus for controlling the optical focusing of adjustable lens means in a video camera, comprising:

filter means including plural filter processor means, each having a respective spectral characteristic ranging from a relatively broad to a relatively narrow spectral characteristic, for deriving higher frequency components of a video signal produced by said video camera;

focus detection means coupled to said filter means for generating a focus detection signal from the higher frequency components derived by said filter means, said focus detection signal representing the focus condition of said lens means;

lens drive means responsive to said focus detection signal for driving said lens means toward a just-focused condition; and selection means for selecting from said filter means filter characteristics having narrower spectral characteristics as said lens means approaches said just-focused condition and comprising coupling means for coupling an individual one of said filter processor means to said focus detection means, means for sensing a rate of change in the focus detection signal level, and means for determining when the rate of change is too low to couple a different filter processor means to said focus detection means.

* * * * *